United States Patent
Sono et al.

(10) Patent No.: US 8,793,293 B2
(45) Date of Patent: Jul. 29, 2014

(54) NUMERICAL ANALYSIS DEVICE AND NUMERICAL ANALYSIS PROGRAM

(75) Inventors: Hiroaki Sono, Toyama (JP); Nobuhiro Yamada, Toyama (JP); Haruya Kitagawa, Toyama (JP); Tsuyoshi Nomura, Toyama (JP)

(73) Assignee: Hokuriku Electric Power Company, Toyama (JP)

( * ) Notice: Subject to any disclaimer, the term of this patent is extended or adjusted under 35 U.S.C. 154(b) by 432 days.

(21) Appl. No.: 13/289,102

(22) Filed: Nov. 4, 2011

(65) Prior Publication Data

US 2012/0047192 A1 Feb. 23, 2012

Related U.S. Application Data

(62) Division of application No. 11/887,003, filed as application No. PCT/JP2006/305742 on Mar. 22, 2006, now abandoned.

(30) Foreign Application Priority Data

Mar. 25, 2005 (JP) ................. 2005-089221

(51) Int. Cl.
*G06F 7/00* (2006.01)
*G06F 17/13* (2006.01)
(52) U.S. Cl.
CPC ..................... *G06F 17/13* (2013.01)
USPC ........................................................ 708/200
(58) Field of Classification Search
USPC .................................. 708/200, 443
See application file for complete search history.

(56) References Cited

U.S. PATENT DOCUMENTS

| | | | | |
|---|---|---|---|---|
| 5,850,356 | A | * | 12/1998 | Yamada et al. ............. 703/6 |
| 6,021,841 | A | * | 2/2000 | Makino ................. 164/456 |
| 6,390,178 | B1 | | 5/2002 | Makino |
| 2004/0167759 | A1 | | 8/2004 | Kawakami |
| 2005/0155431 | A1 | | 7/2005 | Fukuyama et al. |

FOREIGN PATENT DOCUMENTS

| | | |
|---|---|---|
| JP | 7-84997 | 3/1995 |
| JP | 11-317158 | 11/1999 |
| JP | 2002-258933 | 9/2002 |
| JP | 2003-271678 | 9/2003 |
| JP | 2004-62676 | 2/2004 |

OTHER PUBLICATIONS

Haruo Yoshida, "Various Problems in the Study of Hamiltonian Systems", vol. 40, No. 6, Journal of the Society of Instrument and Control Engineers, The Society of Instrument and Control Engineers, Jun. 10, 2001, pp. 411-416.

(Continued)

*Primary Examiner* — Chuong D Ngo
(74) *Attorney, Agent, or Firm* — Wenderoth, Lind & Ponack, L.L.P.

(57) ABSTRACT

A second derivative of a second-order differential equation is calculated at a reference variable value. The second derivative is multiplied by an analytical small variable value, the first derivative at the reference variable value is added, and a result is output as a first derivative after an increment of the analytical small variable value. The first derivative after an increment of the analytical small variable value is multiplied by the analytical small variable value, a physical value at the reference variable value is added, and a result is output as a physical value after an increment of the analytical small variable value.

2 Claims, 29 Drawing Sheets

(56) References Cited

OTHER PUBLICATIONS

Akira Ueda, Introduction to computational physics 8. Molecular dynamics method (Continued), vol. 38, No. 11, Mathematical Sciences, Nov. 1, 2000, pp. 66-74.

International Search Report (in English language) of Jul. 4, 2006 issued in International Application No. PCT/JP2006/305742.

Japanese Office Action (with partial English translation) issued Jan. 19, 2010 in Application No. 2007-510424.

Junichiro Makino, "Verification of method and result of physical simulation", Interface, vol. 28, No. 9, Sep. 1, 2001, pp. 62-71 along with partial English translation.

Japanese Office Action (with English translation) issued Mar. 29, 2011 in Japanese Application No. 2007-510424.

English Translation of JP 11-317158, 1999.

\* cited by examiner

FIG.5
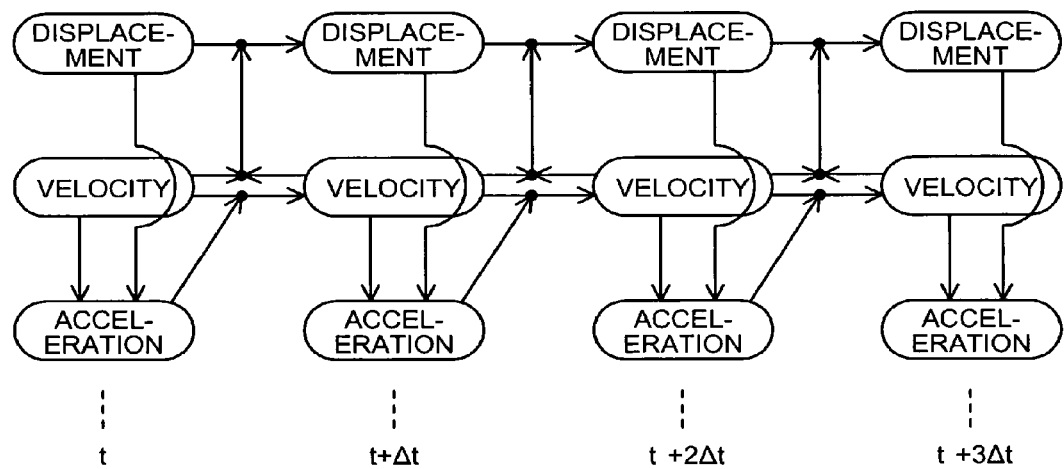
FIG.6
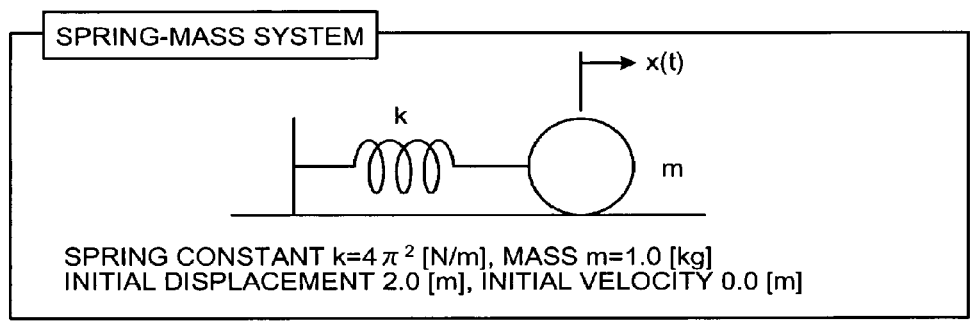
SPRING CONSTANT k=4π² [N/m], MASS m=1.0 [kg]
INITIAL DISPLACEMENT 2.0 [m], INITIAL VELOCITY 0.0 [m]
EQUATION OF MOTION
m α(t)=-kx(t)

— PRESENT INVENTION
— EULER'S METHOD
----- MODIFIED EULER'S METHOD

TIME [s]  Δt=0.01 [s]

| TIME | BEGINNING OF INTERVAL | | ACCEL-ERATION | END OF INTERVAL | |
|---|---|---|---|---|---|
| | DISPLACE-MENT | VELOCITY | | VELOCITY | DISPLACE-MENT |
| C11 0.00 | C12 2.00 | C13 0.00 | C14 -78.96 | C15 -0.79 | C16 1.99 |
| C21 0.01 | C22 1.99 | C23 -0.79 | C24 -78.65 | C25 -1.58 | C26 1.98 |
| ⋮ | ⋮ | ⋮ | ⋮ | ⋮ | ⋮ |
| Cn1 n | Cn2 2.00 | Cn3 -0.13 | Cn4 -78.93 | Cn5 -0.92 | Cn6 1.99 |

FIG.9

(NUMERICAL ANALYSIS FOR EQUATION OF SIMPLE HARMONIC MOTION $\alpha=-(2*\pi)^2*X$ (INITIAL CONDITION X(0)=1, v(0)=0)
ALGEBRAIC SOLUTION X=cos((2*$\pi$)*t))

$v(t+\Delta t)=v(t)+\alpha(t)*\Delta t$
$X(t+\Delta t)=X(t)+v(t+\Delta t)*\Delta t$ TIME INTERVAL [s]
0.01

| ELAPSED TIME | X (INITIAL) | v (INITIAL) | α | v (FINAL) | v (INTERVAL) | X (FINAL) | ALGEBRAIC SOLUTION | ERROR |
|---|---|---|---|---|---|---|---|---|
| 0.00 | 1.000 | 0.000 | -39.48 | -0.395 | -0.395 | 0.996 | 1.000 | 0.000 |
| 0.01 | 0.996 | -0.395 | -39.32 | -0.788 | -0.788 | 0.988 | 0.998 | -0.002 |
| 0.02 | 0.988 | -0.788 | -39.01 | -1.178 | -1.178 | 0.976 | 0.992 | -0.004 |
| 0.03 | 0.976 | -1.178 | -38.55 | -1.564 | -1.564 | 0.961 | 0.982 | -0.006 |
| 0.04 | 0.961 | -1.564 | -37.93 | -1.943 | -1.943 | 0.941 | 0.969 | -0.008 |
| 0.05 | 0.941 | -1.943 | -37.16 | -2.314 | -2.314 | 0.918 | 0.951 | -0.010 |
| 0.06 | 0.918 | -2.314 | -36.25 | -2.677 | -2.677 | 0.891 | 0.930 | -0.012 |
| 0.07 | 0.891 | -2.677 | -35.19 | -3.029 | -3.029 | 0.861 | 0.905 | -0.013 |
| 0.08 | 0.861 | -3.029 | -34.00 | -3.369 | -3.369 | 0.827 | 0.876 | -0.015 |
| 0.09 | 0.827 | -3.369 | -32.67 | -3.696 | -3.696 | 0.790 | 0.844 | -0.017 |
| 0.10 | 0.790 | -3.696 | -31.21 | -4.008 | -4.008 | 0.750 | 0.809 | -0.019 |
| ... | ... | ... | ... | ... | ... | ... | ... | ... |
| 9.93 | 0.922 | 2.618 | -36.41 | 2.254 | 2.254 | 0.945 | 0.905 | 0.017 |
| 9.94 | 0.945 | 2.254 | -37.30 | 1.881 | 1.881 | 0.964 | 0.930 | 0.015 |
| 9.95 | 0.964 | 1.881 | -38.04 | 1.501 | 1.501 | 0.979 | 0.951 | 0.013 |
| 9.96 | 0.979 | 1.501 | -38.63 | 1.114 | 1.114 | 0.990 | 0.969 | 0.010 |
| 9.97 | 0.990 | 1.114 | -39.07 | 0.723 | 0.723 | 0.997 | 0.982 | 0.007 |
| 9.98 | 0.997 | 0.723 | -39.36 | 0.330 | 0.330 | 1.000 | 0.992 | 0.005 |
| 9.99 | 1.000 | 0.330 | -39.49 | -0.065 | -0.065 | 1.000 | 0.998 | 0.002 |
| 10.00 | 1.000 | -0.065 | -39.46 | -0.460 | -0.460 | 0.995 | 1.000 | 0.000 |

FIG.11

(NUMERICAL ANALYSIS FOR EQUATION OF SIMPLE HARMONIC MOTION $\alpha=-(2*\pi)^2*X$ (INITIAL CONDITION X(0)=1, v(0)=0)
ALGEBRAIC SOLUTION $X=\cos((2*\pi)*t)$)

TIME INTERVAL [s]
0.01

EULER'S METHOD: $X(t+\Delta t)=X(t)+v(t)*\Delta t$
$v(t+\Delta t)=v(t)+\alpha(t)*\Delta t$

| ELAPSED TIME | X (INITIAL) | v (INITIAL) | α | v (FINAL) | v (INTERVAL) | X (FINAL) | ALGEBRAIC SOLUTION | ERROR |
|---|---|---|---|---|---|---|---|---|
| 0.00 | 1.000 | 0.000 | -39.48 | -0.395 | 0.000 | 1.000 | 1.000 | 0.000 |
| 0.01 | 1.000 | -0.395 | -39.48 | -0.790 | -0.395 | 0.996 | 0.998 | 0.002 |
| 0.02 | 0.996 | -0.790 | -39.32 | -1.183 | -0.790 | 0.988 | 0.992 | 0.004 |
| 0.03 | 0.988 | -1.183 | -39.01 | -1.573 | -1.183 | 0.976 | 0.982 | 0.006 |
| 0.04 | 0.976 | -1.573 | -38.54 | -1.958 | -1.573 | 0.961 | 0.969 | 0.008 |
| 0.05 | 0.961 | -1.958 | -37.92 | -2.338 | -1.958 | 0.941 | 0.951 | 0.010 |
| 0.06 | 0.941 | -2.338 | -37.15 | -2.709 | -2.338 | 0.918 | 0.930 | 0.011 |
| 0.07 | 0.918 | -2.709 | -36.23 | -3.071 | -2.709 | 0.891 | 0.905 | 0.013 |
| 0.08 | 0.891 | -3.071 | -35.16 | -3.423 | -3.071 | 0.860 | 0.876 | 0.014 |
| 0.09 | 0.860 | -3.423 | -33.94 | -3.762 | -3.423 | 0.826 | 0.844 | 0.016 |
| 0.10 | 0.826 | -3.762 | -32.59 | -4.088 | -3.762 | 0.788 | 0.809 | 0.017 |
| ... | ... | ... | ... | ... | ... | ... | ... | ... |
| 9.93 | 6.132 | 22.148 | -242.07 | 19.727 | 22.148 | 6.353 | 0.905 | 5.227 |
| 9.94 | 6.353 | 19.727 | -250.81 | 17.219 | 19.727 | 6.550 | 0.930 | 5.423 |
| 9.95 | 6.550 | 17.219 | -258.60 | 14.633 | 17.219 | 6.723 | 0.951 | 5.599 |
| 9.96 | 6.723 | 14.633 | -265.40 | 11.979 | 14.633 | 6.869 | 0.969 | 5.754 |
| 9.97 | 6.869 | 11.979 | -271.18 | 9.267 | 11.979 | 6.989 | 0.982 | 5.887 |
| 9.98 | 6.989 | 9.267 | -275.91 | 6.508 | 9.267 | 7.081 | 0.992 | 5.997 |
| 9.99 | 7.081 | 6.508 | -279.56 | 3.712 | 6.508 | 7.147 | 0.998 | 6.083 |
| 10.00 | 7.147 | 3.712 | -282.13 | 0.891 | 3.712 | 7.184 | 1.000 | 6.147 |

NUMERICAL ANALYSIS DEVICE AND NUMERICAL ANALYSIS PROGRAM

This application is a divisional of U.S. application Ser. No. 11/887,003, which is a national stage application of International application No. PCT/JP2006/305742, filed Mar. 22, 2006.

TECHNICAL FIELD

The present invention relates to a numerical analysis device and a numerical analysis program that can be applied to analyze various aspects of motion in natural phenomena and mechanical movements.

BACKGROUND ART

Traditionally Euler's method, in which the displacement and the velocity at the next time point are calculated by using an initial displacement, initial velocity, and initial acceleration in an interval, has been widely used for the numerical analysis using ordinary differential equation (see patent documents 1 and 2).

Patent document 1: Publication of unexamined patent No. 2004-062676

Patent document 2: Publication of unexamined patent No. 2002-258933

DISCLOSURE OF INVENTION

Problem to be Solved by the Invention

Euler's method, however, has a problem that a relatively large error occurs in an analysis result when processing steps are repeated with a small time increment $\Delta t$. Furthermore, there is another problem that when a very small time increment $\Delta t$ is applied to avoid this error so much processing time to obtain an analysis result is needed that the method is eventually impractical to apply.

The present invention is made considering these problems and aims at providing numerical analysis devices and numerical analysis programs that can simply perform a numerical analysis process within a short time period without causing a large error in the analysis result.

Means for Solving Problem

To solve the above problems and to achieve the object, a numerical analysis device according to the present invention performs a numerical analysis of second-order differential equation for a target object to be analyzed. The numerical analysis device includes a setting unit that performs a setting of parameters including an initial condition of the second-order differential equation and a setting of an analytical small variable value for the numerical analysis; a second-derivative calculation unit that calculates a second derivative of the second-order differential equation at a reference variable value that is a variable at the start of the numerical analysis; a first-derivative calculation unit that performs a multiplication of the second derivative calculated by the second-derivative calculation unit by the analytical small variable value and an addition of the first derivative of the second-order differential equation at the reference variable value to a value obtained by the multiplication, and outputs a value obtained by the addition as a first derivative after an increment of the analytical small variable value; a physical-value calculation unit that performs a multiplication of the first derivative calculated by the first-derivative calculation unit by the analytical small variable value and an addition of a physical value of the second-order differential equation at the reference variable value to a value obtained by the multiplication, and outputs a value obtained by the addition as a physical value after an increment of the analytical small variable value; and an operation control unit that repeats a control of setting a variable value obtained by adding the analytical small variable value to the reference variable value as a new reference variable value and causing the second-derivative calculation unit, the first-derivative calculation unit, and the physical-value calculation unit to calculate the second derivative, the first derivative, and the physical value, using the new reference variable value, respectively.

Furthermore, a numerical analysis device according to the present invention performs a numerical analysis of second-order differential equation for a target object to be analyzed. The numerical analysis device includes a setting unit that performs a setting of parameters including an initial condition of the second-order differential equation and a setting of an analytical small variable value for the numerical analysis; a second-derivative calculation unit that calculates a second derivative of the second-order differential equation at a reference variable value that is a variable at the start of the numerical analysis; a first-derivative calculation unit that performs a multiplication of the second derivative calculated by the second-derivative calculation unit by the analytical small variable value and an addition of the first derivative of the second-order differential equation at the reference variable value to a value obtained by the multiplication, and outputs a value obtained by the addition as a first derivative after an increment of the analytical small variable value; a physical-value calculation unit that performs a multiplication of the second derivative calculated by the second-derivative calculation unit by a square value of the analytical small variable value, a multiplication of the first derivative calculated by the first-derivative calculation unit by the analytical small variable value, and an addition of values obtained by the multiplications and a physical value of the second-order differential equation at the reference variable value, and outputs a value obtained by the addition as a physical value after an increment of the analytical small variable value; and an operation control unit that repeats a control of setting a variable value obtained by adding the analytical small variable value to the reference variable value as a new reference variable value and causing the second-derivative calculation unit, the first-derivative calculation unit, and the physical-value calculation unit to calculate the second derivative, the first derivative, and the physical value, using the new reference variable value, respectively.

Moreover, in the numerical analysis device according to the present invention, the analytical small variable value and the reference variable value are an analytical small time and reference time, respectively, and the first derivative and the second derivative are a first-order time derivative and a second-order time derivative, respectively.

Furthermore, in the numerical analysis device according to the present invention, the setting unit sets a termination condition of the numerical analysis, and when the termination condition of the numerical analysis is satisfied, the operation control unit performs a control of terminating the numerical analysis.

Moreover, the numerical analysis device according to the present invention further includes an output processing unit that outputs the physical value of each reference variable value calculated by the physical-value calculation unit, in association with the increment of the analytical small variable value.

Furthermore, in the numerical analysis device according to the present invention, the output processing unit generates a graph of the physical value for each reference variable value calculated by the physical-value calculation unit corresponding to the increment of the analytical small variable value.

Moreover, in the numerical analysis device according to the present invention, the second-order differential equation includes a variable value term.

Furthermore, in the numerical analysis device according to the present invention, the second-order differential equation includes a time term.

Moreover, in the numerical analysis device according to the present invention, the second-order differential equation is a simultaneous equation with multiple unknowns.

Furthermore, in the numerical analysis device according to the present invention, the numerical analysis is performed using a spreadsheet program.

Moreover, a numerical analysis program according to the present invention is for a numerical analysis of second-order differential equation for a target object to be analyzed. The numerical analysis program causes a computer to execute a setting procedure of performing a setting of parameters including an initial condition of the second-order differential equation and a setting of an analytical small variable value for the numerical analysis; a second-derivative calculating procedure of calculating a second derivative of the second-order differential equation at a reference variable value that is a variable at the start of the numerical analysis; a first-derivative calculating procedure of performing a multiplication of the second derivative calculated at the second-derivative calculating procedure by the analytical small variable value and an addition of the first derivative of the second-order differential equation at the reference variable value to a value obtained by the multiplication, and outputting a value obtained by the addition as a first derivative after an increment of the analytical small variable value; a physical-value calculating procedure of performing a multiplication of the first derivative calculated at the first-derivative calculating procedure by the analytical small variable value and an addition of a physical value of the second-order differential equation at the reference variable value to a value obtained by the multiplication, and outputting a value obtained by the addition as a physical value after an increment of the analytical small variable value; and an operation control procedure of repeating a control of setting a variable value obtained by adding the analytical small variable value to the reference variable value as a new reference variable value and causing the second-derivative calculating procedure, the first-derivative calculating procedure, and the physical-value calculating procedure to calculate the second derivative, the first derivative, and the physical value, using the new reference variable value, respectively.

Furthermore, a numerical analysis program according to the present invention is for a numerical analysis of second-order differential equation for a target object to be analyzed. The numerical analysis program causes a computer to execute a setting procedure of performing a setting of parameters including an initial condition of the second-order differential equation and a setting of an analytical small variable value for the numerical analysis; a second-derivative calculating procedure of calculating a second derivative of the second-order differential equation at a reference variable value that is a variable at the start of the numerical analysis; a first-derivative calculating procedure of performing a multiplication of the second derivative calculated at the second-derivative calculating procedure by the analytical small variable value and an addition of the first derivative of the second-order differential equation at the reference variable value to a value obtained by the multiplication, and outputting a value obtained by the addition as a first derivative after an increment of the analytical small variable value; a physical-value calculating procedure of performing a multiplication of the second derivative calculated at the second-derivative calculating procedure by a square value of the analytical small variable value, a multiplication of the first derivative calculated at the first-derivative calculating procedure by the analytical small variable value, and an addition of values obtained by the multiplications and a physical value of the second-order differential equation at the reference variable value, and outputting a value obtained by the addition as a physical value after an increment of the analytical small variable value; and an operation control procedure of repeating a control of setting a variable value obtained by adding the analytical small variable value to the reference variable value as a new reference variable value and causing the second-derivative calculating procedure, the first-derivative calculating procedure, and the physical-value calculating procedure to calculate the second derivative, the first derivative, and the physical value, using the new reference variable value, respectively.

Moreover, in the numerical analysis program according to the present invention, the analytical small variable value and the reference variable value are an analytical small time and reference time, respectively, and the first derivative and the second derivative are a first-order time derivative and a second-order time derivative, respectively.

Furthermore, in the numerical analysis program according to the present invention, the setting procedure includes setting a termination condition of the numerical analysis, and when the termination condition of the numerical analysis is satisfied, the operation control procedure includes performing a control of terminating the numerical analysis.

Moreover, the numerical analysis program according to the present invention further causes the computer to execute an output processing procedure of outputting the physical value of each reference variable value calculated at the physical-value calculating procedure, in association with the increment of the analytical small variable value.

Furthermore, in the numerical analysis program according to the present invention, the output processing procedure includes generating a graph of the physical value for each reference variable value calculated at the physical-value calculating procedure corresponding to the increment of the analytical small variable value.

Moreover, in the numerical analysis program according to the present invention, the second-order differential equation includes a variable value term.

Furthermore, in the numerical analysis program according to the present invention, the second-order differential equation includes a time term.

Moreover, in the numerical analysis program according to the present invention, the second-order differential equation is a simultaneous equation with multiple unknowns.

Furthermore, in the numerical analysis program according to the present invention, the numerical analysis is performed using a spreadsheet program.

Effect of the Invention

By using a numerical analysis device or a numerical analysis program according to the present invention, the effect is obtained that a numerical analysis process can simply be performed within a short time period without causing a large error in the analysis result, because a setting unit sets parameters, including initial conditions for a second-order differential equation, and analytical small variable value of the numerical analysis, a second-derivative calculation unit calculates a second derivative of a second-order differential equation at a reference variable value that is the variable value at the start of the analysis, a first-derivative calculation unit multiplies the second derivative calculated by the second-derivative calculation unit by the analytical small variable value, adds the first derivative of the second-order differential equation at the reference variable value to this multiplied value, and equates this added value to the first derivative after increment of the analytical small variable value, a physical-value calculation unit multiplies the first derivative calculated by the first-derivative calculation unit by the analytical small variable value, adds the physical value of the second-order differential equation at the reference variable value to this multiplied value, and equates this added value to the physical value after increment of the analytical small variable value, an operation control unit repeats control to set the variable value that is addition of the reference variable value with the analytical small variable value to the new reference variable value, and to calculate the second derivative, the first derivative, and the physical value by the second-derivative calculation unit, the first-derivative calculation unit, and the physical-value calculation unit, by using the new reference variable value, respectively.

Also by using a numerical analysis device or a numerical analysis program according to the present invention, the effect is obtained that a numerical analysis process can simply be performed within a short time period without causing a large error in the analysis result, because a setting unit sets parameters, including initial conditions for a second-order differential equation, and analytical small variable value of a numerical analysis, a second-derivative calculation unit calculates a second derivative of a second-order differential equation at a reference variable value that is the variable value at the start of the analysis, a first-derivative calculation unit multiplies the second derivative calculated by the second-derivative calculation unit by the analytical small variable value, adds the first derivative of the second-order differential equation at the reference variable value to this multiplied value, and equates this added value to the first derivative after increment of the analytical small variable value, a physical-value calculation unit multiplies the second derivative calculated by the second-derivative calculation unit by the square value of the analytical small variable value, multiplies the first derivative calculated by the first-derivative calculation unit by the analytical small variable value, adds the physical value of the second-order differential equation at the reference variable value to these multiplied values, and equates this added value to the physical value after increment of the analytical small variable value, the operation control unit repeats control to set the variable value that is addition of the reference variable value with the analytical small variable value to the new reference variable value, and to calculate the second derivative, the first derivative and the physical value by the second-derivative calculation unit, the first-derivative calculation unit, and the physical-value calculation unit, by using the new reference variable value, respectively.

BRIEF DESCRIPTION OF DRAWINGS

FIG. 5 is a diagram of the concept of the dynamic analysis process according to conventional modified Euler's method.

FIG. 6 is a schematic diagram illustrating the concept of configuration of a spring-mass system to which analysis equation is applied.

FIG. 9 is a chart of an example of a dynamic analysis for the spring-mass system shown in FIG. 6 performed by a spreadsheet program.

FIG. 11 is a chart of an example of a dynamic analysis result for the same spring-mass system by Euler's method.

EXPLANATIONS OF LETTERS OR NUMERALS

1 DYNAMIC ANALYSIS DEVICE
10 INPUT UNIT
11 OUTPUT UNIT
12 OPERATION UNIT
13 OUTPUT PROCESSING UNIT
14 MEMORY UNIT
20 OPERATION CONTROL MODULE
21 INCLUSION MODULE
22 SECOND-ORDER-DERIVATIVE CALCULATION MODULE
23 FIRST-ORDER-DERIVATIVE CALCULATION MODULE
24,24A PHYSICAL-VALUE CALCULATION MODULE

BEST MODE(S) FOR CARRYING OUT THE INVENTION

Exemplary embodiments of a dynamic analysis device as an example of a numerical analysis device and a dynamic analysis program as an example of a numerical analysis program according to the present invention will be explained in detail.

(First Embodiment)

Figure 1:
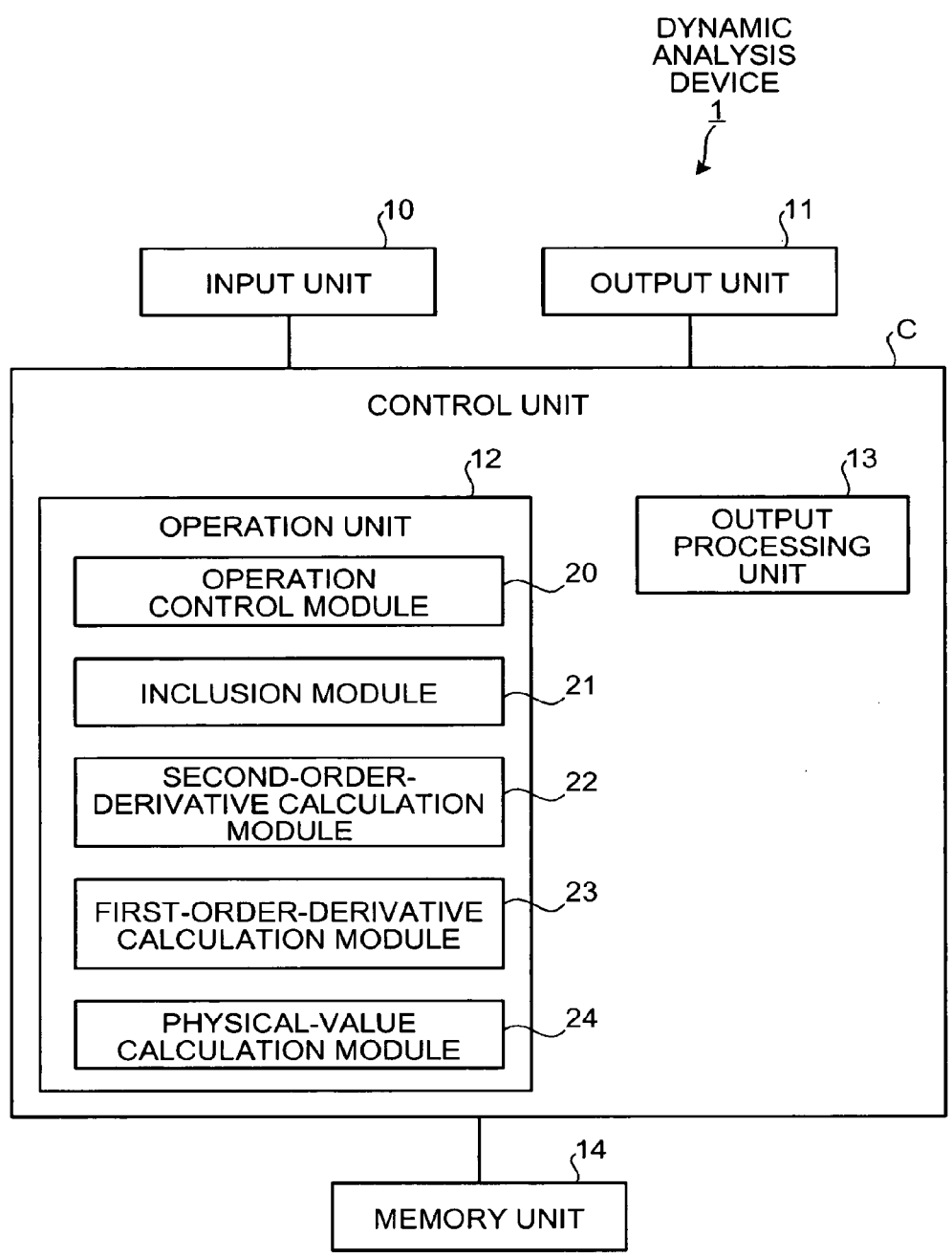
FIG. 1 is a block diagram of an outline of configuration of a dynamic analysis device that is a numerical analysis device according to the first embodiment of the present invention.

FIG. 1 is a block diagram of an outline of configuration of a dynamic analysis device that is an example of numerical analysis device according to the first embodiment of the present invention.

As shown in FIG. 1 dynamic analysis device 1 includes an input unit 10 that is implemented with a keyboard and a pointing device to input various information, an output unit 11 that is implemented with an LCD display, a printer and the like to output processing result, a memory unit 14 that is used to store programs and data as well as to store calculation results temporarily, and a control unit C that controls performing a dynamic analysis process.

The control unit C includes an operation unit 12 and an output processing unit 13, the operation unit 12 performs a dynamic analysis processing, and the output processing unit 13 performs a process to output the result of dynamic analysis to the output unit 11. The operation unit 12 includes an operation control module 20, an inclusion module 21, a second-order-derivative calculation module 22, a first-order-derivative calculation module 23, and a physical-value calculation module 24.

Figure 2:
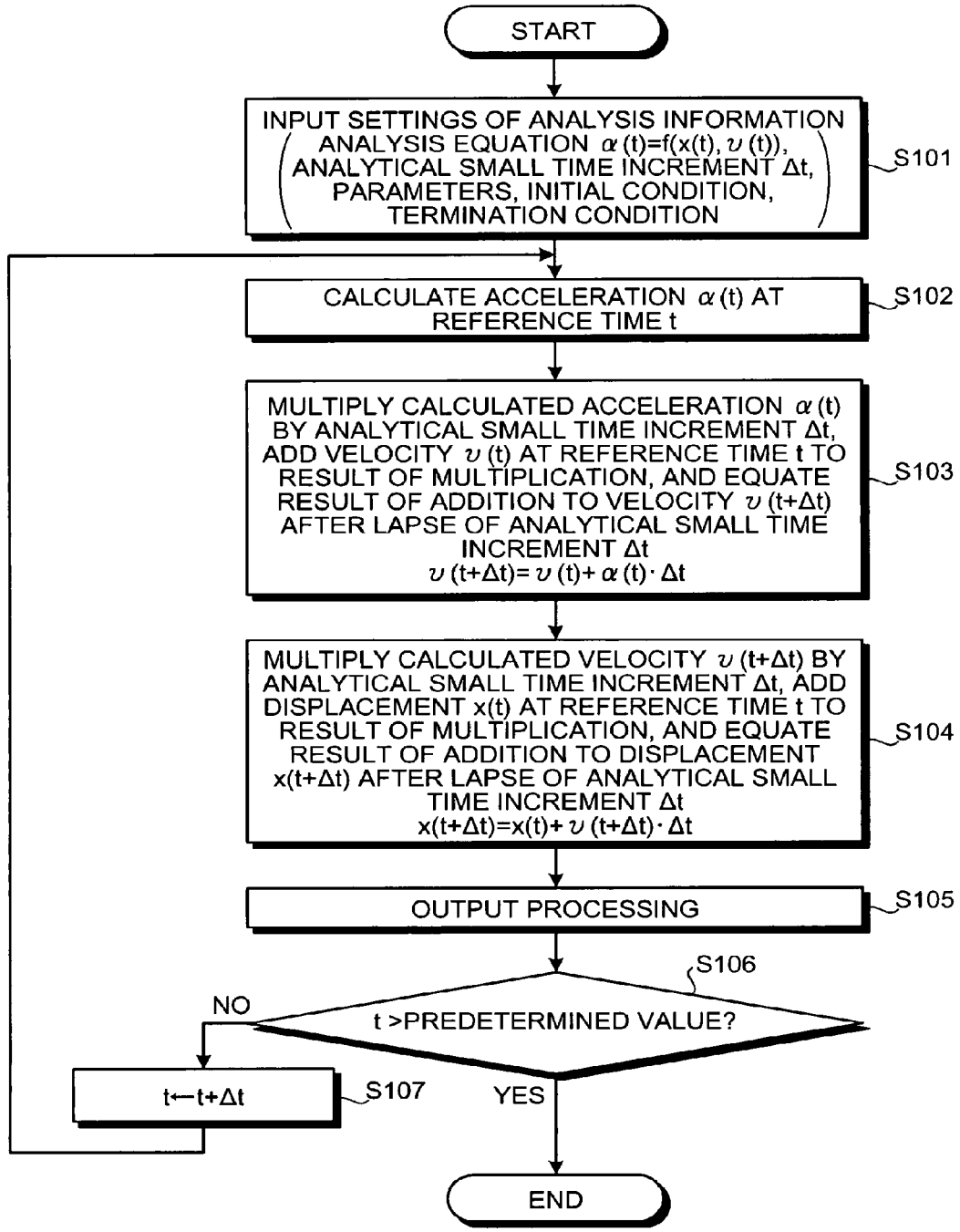
FIG. 2 is a flow chart of a dynamic analysis procedure by the dynamic analysis device shown in FIG. 1.

Referring the flowchart shown in FIG. 2, the procedure of control process of the control unit C is explained. Firstly, in FIGS. 1 and 2, analysis information is input by the inclusion module 21 by using the input unit 10 and the output unit 11 (step S101). The analysis information includes an analysis equation $\alpha(t)=f(x(t),v(t))$, an analytical small time increment $\Delta t$, further, parameters, initial conditions and termination conditions and the like. The analysis equation here is an ordinary second-order differential equation and the $\alpha(t)$ is a second-order time derivative such as acceleration, $x(t)$ is a physical value such as position, and $v(t)$ is a first-order time derivative such as velocity.

The second-order-derivative calculation module 22 calculates an acceleration $\alpha(t)$ at the time of reference t using initial conditions (step S102). Then the first-order-derivative calculation module 23 multiplies the calculated acceleration $\alpha(t)$ by the analytical small time increment $\Delta t$, adds the velocity at the reference time to this multiplied value and equates this added value to the velocity $v(t+\Delta t)$ after elapse of the analytical small time increment $\Delta t$ (step S103). Namely, $v(t+\Delta t)=v(t)+\alpha(t)\cdot\Delta t$ is calculated.

Then the physical-value calculation module 24 multiplies the calculated velocity $v(t+\Delta t)$ by the analytical small time increment $\Delta t$, adds the displacement $x(t)$ at the reference time t to this added value, and equates this added value to the displacement $x(t+\Delta t)$ after elapse of the analytical small time increment $\Delta t$. Namely, $x(t+\Delta t)=x(t)+v(t+\Delta t)\cdot\Delta t$ is calculated.

The operation unit 12 stores the calculated value at step S102 to S104 into the memory unit 14 and also performs an output processing to enable output from the output unit 11 via the output processing unit 13 (step S105). Further the operation unit 12 decides whether t exceeds a specified value (step S106). Here the specified value is time elapsed from the reference time t. This elapsed time can be given as $\Delta t \times n$, where n is the number of repetition thereafter. If t does not exceed the specified value (step S106, No), value (t+$\Delta t$) that is the addition of the reference time t with the analytical small time increment $\Delta t$ is set as a new reference time, the step moves to step S102 (step S107), and processes from step S102 is repeated. If t exceeds the specified value (step S106, Yes), the process is terminated.

In other words, a displacement x(t+$\Delta t$) after lapse of the analytical small time increment $\Delta t$ is calculated in this dynamic analysis process by the dynamic analysis device 1 as follows: firstly the acceleration $\alpha(t)$ that is an analysis equation at the reference time t is calculated by equation (1) using the displacement x(t) that is a physical value at the reference time t and the velocity v(t) that is a first-order time derivative at the reference time t. Then v(t+$\Delta t$) that is the velocity after elapse of the analytical small time increment $\Delta t$ is calculated by equation (2), further x(t+$\Delta t$) that is the displacement after elapse of the analytical small time increment $\Delta t$ is calculated by equation (3).

$$\alpha(t)=f(x(t),v(t)) \quad (1)$$

$$v(t+\Delta t)=v(t)+\alpha(t)\cdot\Delta t \quad (2)$$

$$x(t+\Delta t)=x(t)+v(t+\Delta t)\cdot\Delta t \quad (3)$$

Some conventional dynamic analysis devices utilize Euler's method where displacements are calculated by equation (4) below where v(t) is used instead of v(t+$\Delta t$) in the equation (3). Namely, displacements are calculated by $$x(t+\Delta t)=x(t)+v(t)\cdot\Delta t \quad (4)$$

However, there are some cases with Euler's method where divergence occurs when a dynamic analysis is performed on a simple harmonic motion and the like. Then modified Euler's method was contrived that uses equation (5) below instead of equation (3).

$$x(t+\Delta t)=x(t)+(1/2\cdot(v(t)+v(t+\Delta t)))\cdot\Delta t \quad (5)$$

In modified Euler's method the dynamic analysis is performed replacing v(t+$\Delta t$) with (1/2·(v(t)+v(t+$\Delta t$))) that is the average velocity between the reference time t and (t+$\Delta t$) which is the time after elapse of the analytical small time increment $\Delta t$ from the reference time t. By modified Euler's method degree of divergence can be reduced but it may still result in a dynamic analysis with divergence and low accuracy. Therefore, when a dynamic analysis by Euler's method or modified Euler's method is applied it has been inevitable to make the analytical small time increment $\Delta t$ extremely small and to consume a lot of time to obtain necessary accuracy. In contrast to this, by the dynamic analysis process where equations (1) to (3) are repeated, a result of high accuracy can be obtained even if the analytical small time increment $\Delta t$ is very small.

Figure 3:
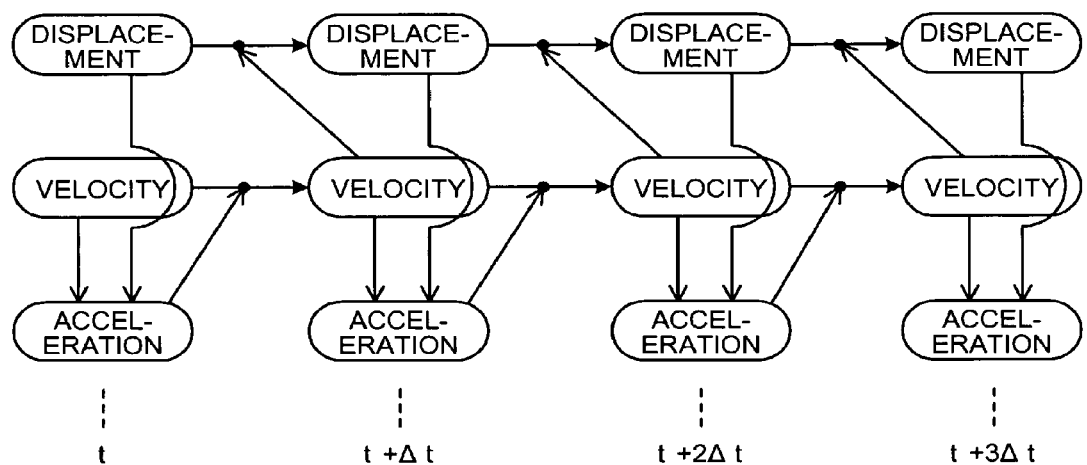
FIG. 3 is a diagram of the concept of the dynamic analysis process according to the first embodiment of the present invention.
Figure 4:
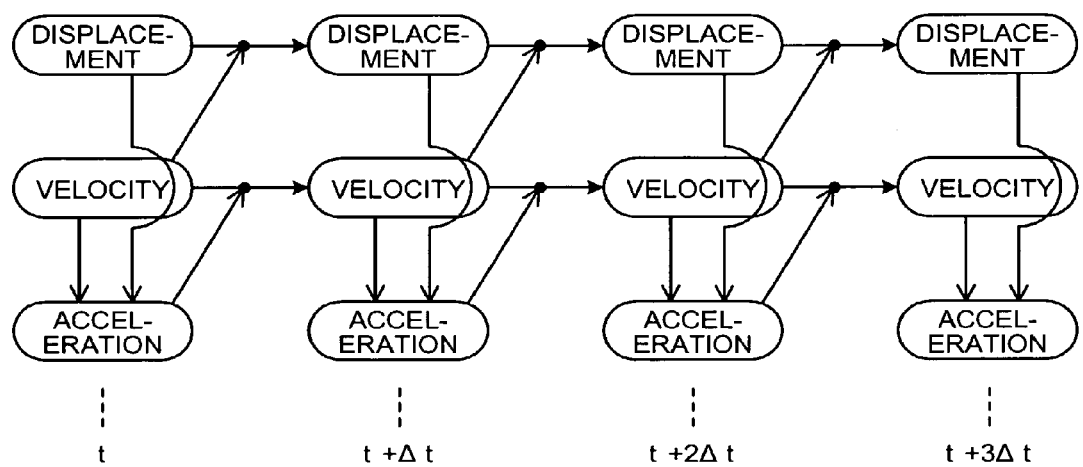
FIG. 4 is a diagram of the concept of the dynamic analysis process according to conventional Euler's method.

FIGS. 3 to 5 are diagrams of the concepts of dynamic analysis processes according to the present invention, conventional Euler's method, and modified Euler's method respectively. FIG. 3 is a diagram of the concept of a dynamic analysis process according to the first embodiment of the present invention, FIG. 4 is a diagram of the concept of the dynamic analysis process according to conventional Euler's method, and FIG. 5 is a diagram of the concept of the dynamic analysis process according to modified Euler's method. Referring FIGS. 3 to 5, in the dynamic analysis process according to the present invention, acceleration is obtained from the displacement and the velocity at time t, velocity at time (t+$\Delta t$) that is time after elapse of the analytical small time increment $\Delta t$ is obtained from the velocity and the acceleration at time t as shown in FIG. 3. Then displacement at time (t+$\Delta t$) is obtained from the velocity at time (t+$\Delta t$) and the displacement at time t, and it is specifically characterized in that displacement at time (t+$\Delta t$) is obtained by using the velocity at time (t+$\Delta t$). On the other hand, in Euler's method displacement at time (t+$\Delta t$) is obtained by using the velocity at time t and the displacement at time t as shown in FIG. 4. Further in conventional modified Euler's method displacement at time (t+$\Delta t$) is obtained by using velocity (1/2·(v(t)+v(t+$\Delta t$))), which is the average velocity at time t and time (t+$\Delta t$) as shown in FIG. 5.

A result of processing an analysis equation for a concrete simple harmonic motion is now explained. FIG. 6 is a schematic diagram of a conceptual structure of a spring-mass system to which an analysis equation is applied. A simple harmonic motion appears in the spring-mass system shown in FIG. 6. An equation of motion for the spring-mass system shown in FIG. 6 is given as equation (6) below.

$$m\cdot\alpha(t)=-k\cdot x(t) \quad (6)$$

In this spring-mass system a spring constant k=$4\pi^2$ (N/m), mass m=1.0 (kg), initial displacement x(0)=2.0 (m), and initial velocity v(0)=0.00 (m) are assumed.

An analysis equation for this equation of motion is given as equation (7) below.

$$\alpha(t)=-k/m\cdot x(t) \quad (7)$$

After the parameters are assigned the analysis equation becomes equation (8) below.

$$\alpha(t)=-4\pi^2\cdot x(t) \quad (8)$$

The algebraic solution of this spring-mass system is expressed in equation (9) below, $$x(t)=\cos(2\pi\cdot t) \quad (9)$$

where the analytical small time increment $\Delta t$=0.01 (s) is applied.

Figures 7, 8:
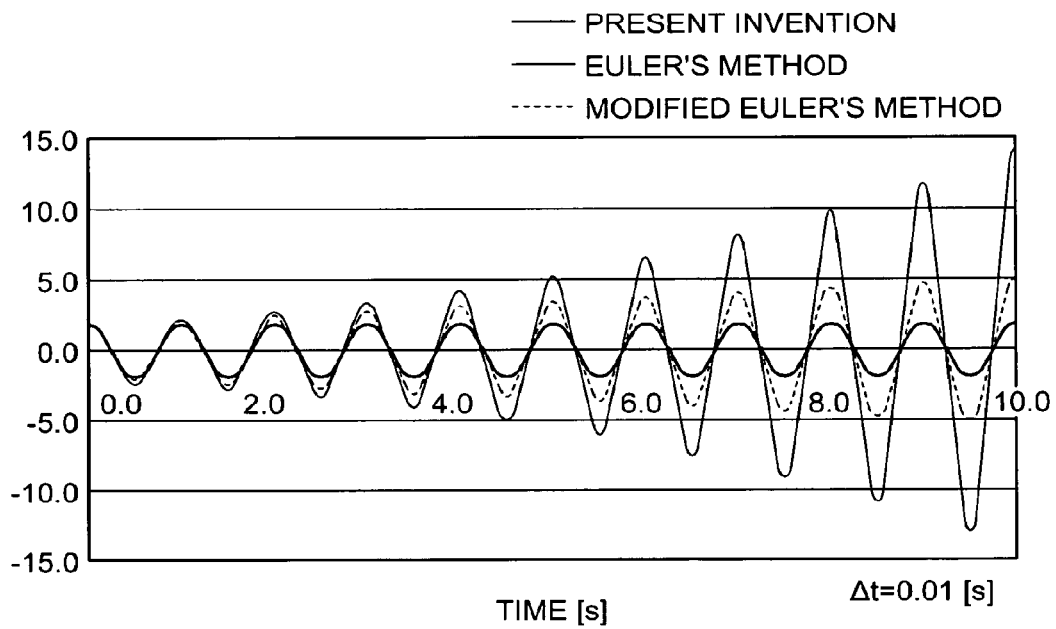
FIG. 7 is a diagram of a dynamic analysis result of the spring-mass system shown in FIG. 6.
FIG. 8 is a view of an example of a display screen of a spreadsheet program for dynamic analysis of the spring-mass system shown in FIG. 7.

FIG. 7 is a diagram of a dynamic analysis result of the spring-mass system shown in FIG. 6. This dynamic analysis is performed with the analytical small time increment $\Delta t$=0.01 (s). As shown in FIG. 7, divergence occurs in Euler's method as well as in modified Euler's method with time lapse, while a result near the algebraic solution without divergence is obtained from the dynamic analytical process according to the present invention. Therefore, according to the first embodiment of the present invention can perform a dynamic analysis of high accuracy in a short period of time comparing with Euler's method or modified Euler's method. In other words, the dynamic analysis process according to the first embodiment of the present invention can perform a dynamic analysis of much higher accuracy than Euler's method or modified Euler's method in the same analysis time period.

The dynamic analysis process of the first embodiment is not a complicate program and therefore it can easily be implemented by software using a spreadsheet program. FIG. 8 is a view of an example of display screen of a spreadsheet program for a dynamic analysis of the spring-mass system shown in FIG. 7. In FIG. 8 initial time t=0.00 is firstly set in cell C11 of the time column and then the analytical small time increment $\Delta t$=0.01 is added to C21 to Cn1. The initial displacement x(0)=2.00 is set in cell C12 of the displacement column of the beginning of the interval that represents reference time point t, and the initial velocity v(0)=0.00 is set in cell C13 of the velocity column of the beginning of the interval. Acceleration is calculated using the displacement and the velocity given in cell C12 and C13 respectively and the result is shown in cell C14 of the acceleration column. The calculation result corresponding to equation (2) is shown in cell C15 of the velocity column of the end of the interval that represents after lapse of the analytical small time increment Δt from the reference time t, and the calculation result corresponding to equation (2) is shown in cell C16 of the velocity column of the end of the interval. The results indicated in cells C15 and C16 are copied into cells C22 and C23 of the next row for the time after lapse of the analytical small time increment Δt as the displacement and velocity at the beginning of the next interval respectively. Further, acceleration is calculated using the displacement and velocity indicated in C22 and C23, the result of the calculation is shown in cell C24, and then the velocity and displacement after next lapse of the analytical small time increment Δt are calculated using the displacement, velocity, and acceleration shown in cell C22, C23 and C24 respectively, and the results are shown in cells C25 and C26. In the same way hereafter, the process, in which the velocity and displacement at the end of the interval are utilized as the velocity and displacement at the beginning of the next interval after lapse of the analytical small time increment Δt and acceleration at this time point is calculated and displayed, and also the velocity and displacement at the end of the next interval after lapse of the analytical small time increment Δt are calculated and displayed, is repeated for repeat count that is set in the time row, namely number of the rows. These results can also be displayed in a graph by graphing process. The graphing process is carried out by the output processing unit 13.

Figure 10:
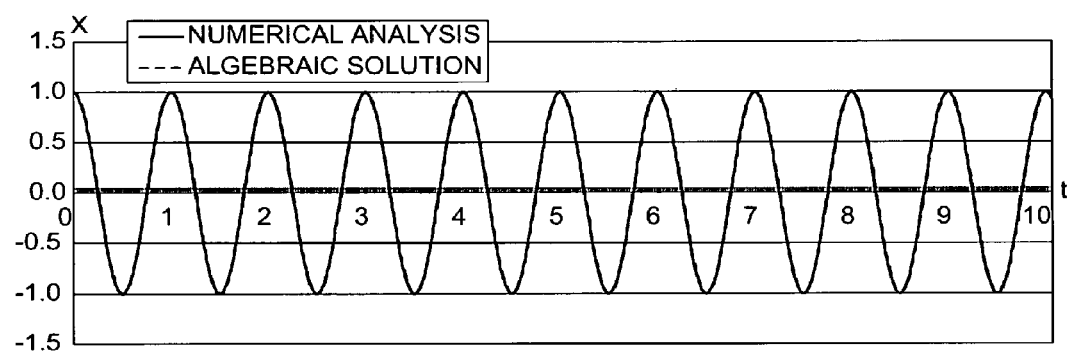
FIG. 10 is a graph of the result shown in FIG. 9.

FIG. 9 is a chart of an example that a dynamic analysis for the spring-mass system shown in FIG. 6 is performed by a spreadsheet program. Here an initial displacement x(0)=1.000 (m) is assumed. FIG. 10 is a graph of the result shown in FIG. 9, where the horizontal axis indicates time and the vertical axis indicates displacement. As shown in FIG. 10, the algebraic solution and the result of a numerical analysis (dynamic analysis) are nearly in coincidence and the error is ±0.042 m. FIG. 10 shows the result of a dynamic analysis for up to 10 (s), but even for 100 (s) the error of the dynamic analysis is only ±0.134 m.

Figure 12:
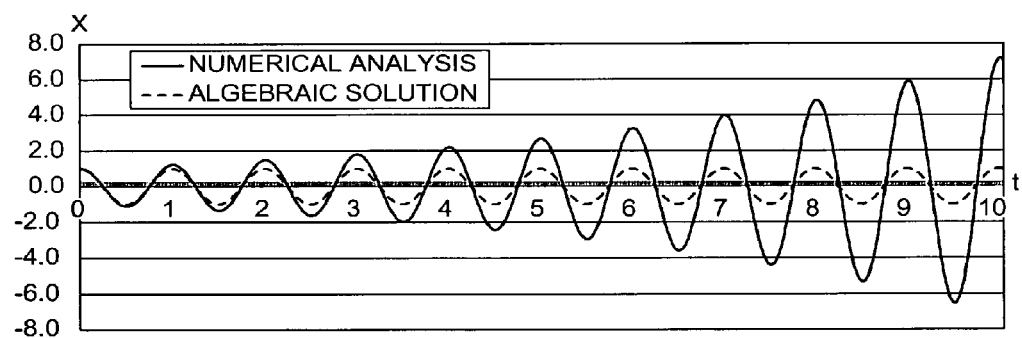
FIG. 12 is a graph of the result shown in FIG. 11.
Figure 13:
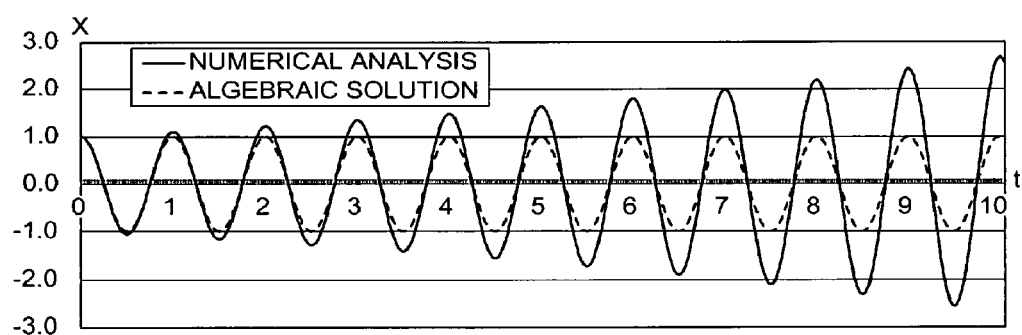
FIG. 13 is a graph of an example of a dynamic analysis result for the same spring-mass system by modified Euler's method.

FIG. 11 is a chart of an example that a dynamic analysis for the same spring-mass system is performed by Euler's method, FIG. 12 is a graph of the result shown in FIG. 11, and FIG. 13 is a graph of an example that a dynamic analysis for the same spring-mass system is performed by modified Euler's method. As shown in FIGS. 11 and 12, when a dynamic analysis is performed by Euler's method using the same analytical small time increment, the error between the dynamic analysis and the algebraic solution increases with time and diverges. In this case, the error increases up to ±6 m in 10 (s). When modified Euler's method is employed, as shown in FIG. 13, the error between the dynamic analysis and the algebraic solution also increases with time and diverges. In this case, the error is smaller than that by Euler's method, but still reaches about ±2 m in 10 (s).

(Second Embodiment)

Now the second embodiment is explained. In the first embodiment, using the present first-order time derivative like velocity and the present second derivative like acceleration, the first-order time derivative at the next time point is calculated, and then using the first-order time derivative at the next time point and the present physical value like displacement the next physical value at the next time point is obtained, in this second embodiment, however, the physical value at the next time point is obtained at once using the present first-order time derivative, the present second-order time derivative, and the present physical value. In this regard, the first-order time derivative at the next time point that is used to calculate the second-order time derivative at the next time point shall already be calculated at present time point.

Figure 14:
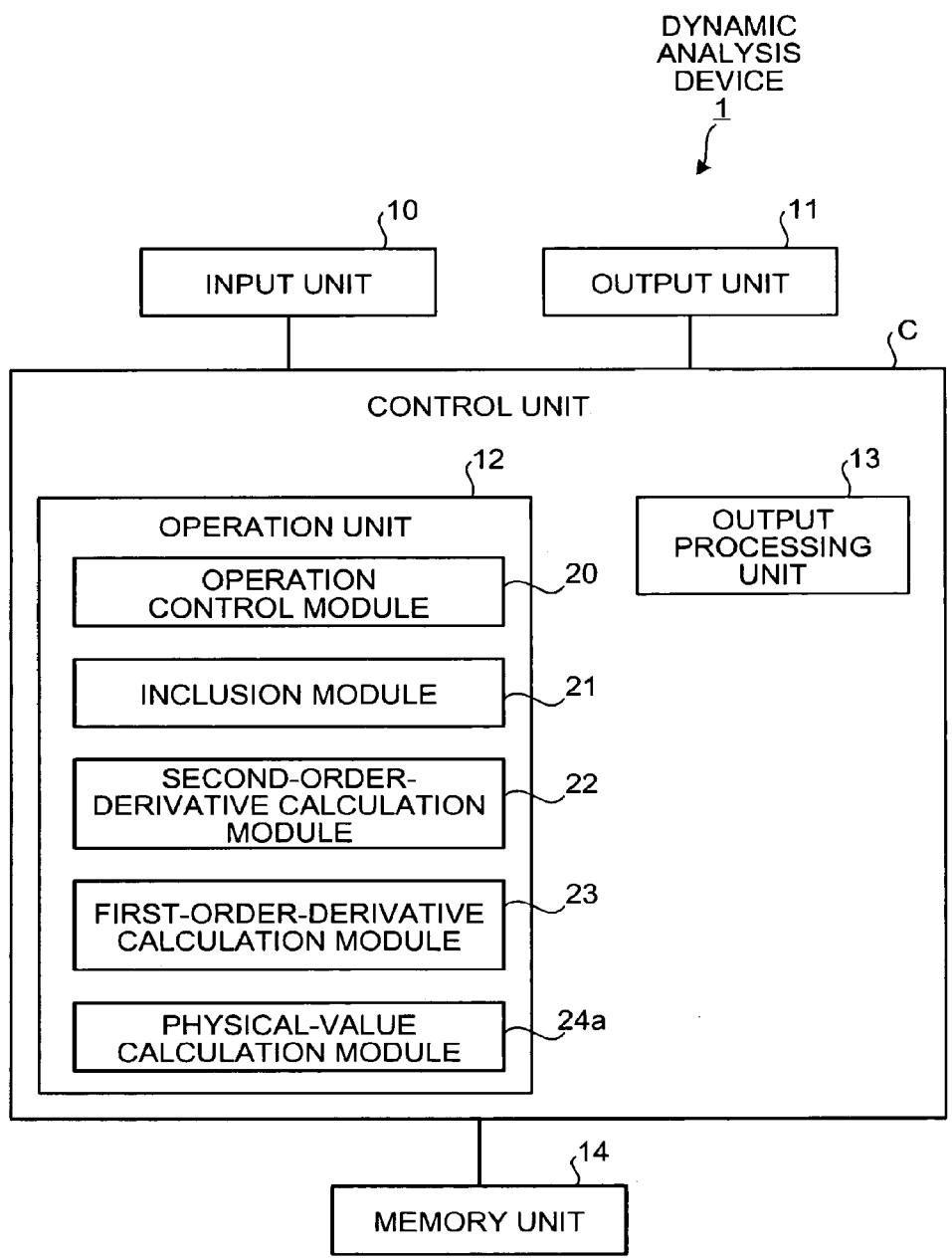
FIG. 14 is a block diagram of an outline of configuration of a dynamic analysis device according to the second embodiment of the present invention.

FIG. 14 is a block diagram of an outline of configuration of a dynamic analysis device according to the second embodiment of the present invention. As shown in FIG. 14, the dynamic analysis device includes a physical-value calculation module 24a instead of the physical-value calculation module 24. Otherwise, the configuration is the same as in the first embodiment, and therefore the same reference numerals are applied to the same components in the configuration.

The second-order-derivative calculation module 22 calculates acceleration α(t) using velocity v(t) that was calculated by the first-order-derivative calculation module 23 and displacement x(t) at the reference time t that was calculated by the physical-value calculation module 24, and then the physical-value calculation module 24a calculates directly displacement x(t+Δt) after lapse of the analytical small time increment Δt using the acceleration α(t), the velocity v(t), and the displacement x(t) at the reference time t. It means that the displacement x(t+Δt) can be directly obtained from equation (10) below that is derived by combining equation (2) with equation (3).

$$x(t+\Delta t)=x(t)+v(t)\cdot\Delta t+\alpha(t)\cdot\Delta t^2 \quad (10)$$

Figure 15:
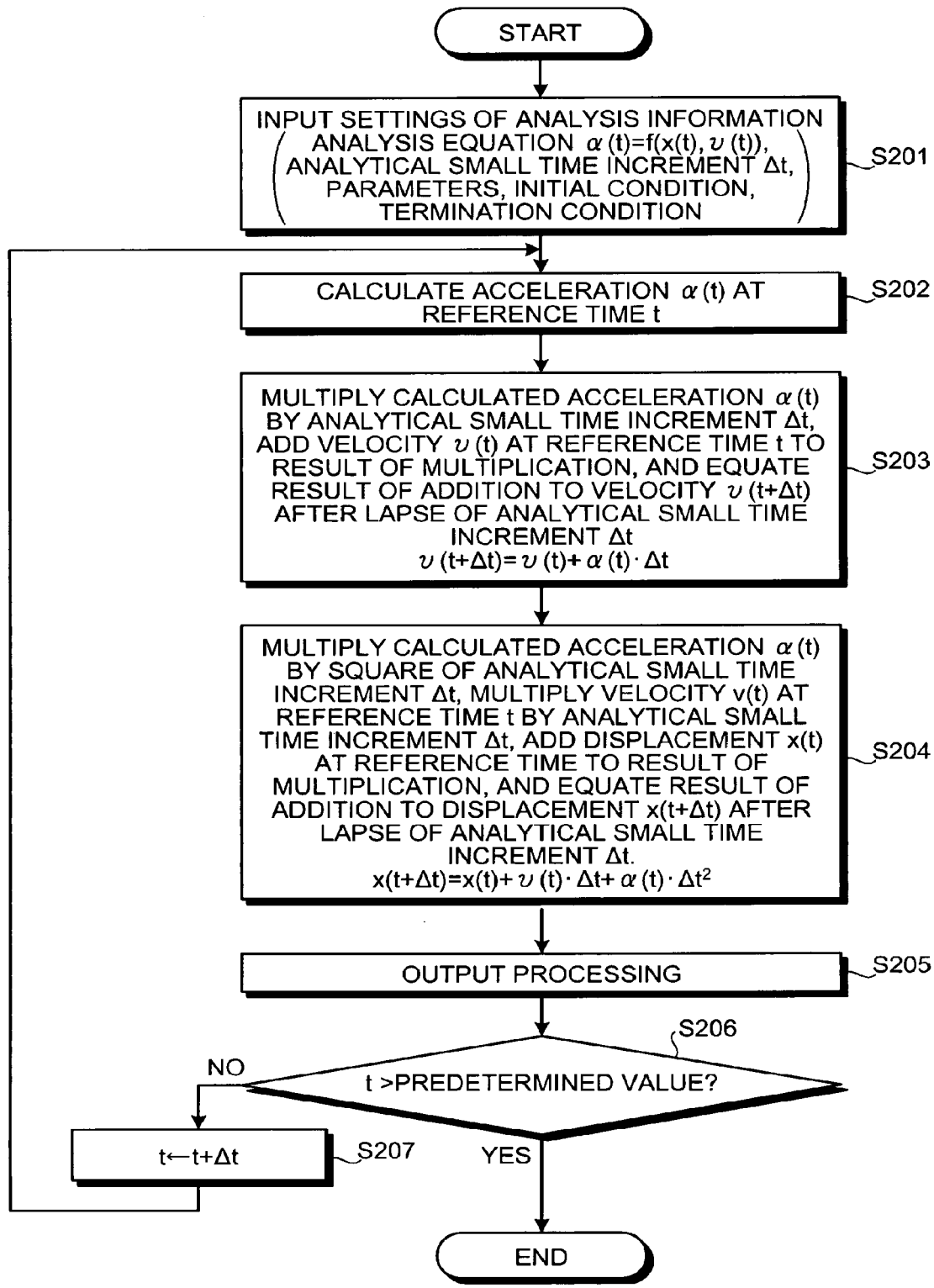
FIG. 15 is a flow chart of a dynamic analysis procedure by the dynamic analysis device shown in FIG. 14.

FIG. 15 is a flow chart of a dynamic analysis procedure by the dynamic analysis device shown in FIG. 14. In the dynamic analysis procedure shown in FIG. 15 process step S204 is applied instead of process step S104 in the first embodiment. Otherwise steps S201 to S203 are same as S101 to S103, and S205 to S207 are same as S105 to S107, respectively.

Namely at step S204 the acceleration α(t) calculated at step S204 is multiplied by square value of the analytical small time increment Δt, the velocity v(t) at the reference time t is multiplied by the analytical small time increment Δt, each multiplied value is added to the displacement x(t) at the reference time t, and this added value is equated to the displacement x(t+Δt) after lapse of the analytical small time increment Δt. The reason why v(t) at the reference time is calculated at step S203 is that, different from the first embodiment, the v(t) necessary for calculation of the displacement at the next time point has not yet been calculated.

Thus in the second embodiment, different from the first embodiment, the velocity v(t+Δt) after lapse of the analytical small time increment Δt can be calculated at once using the present velocity, acceleration, and displacement.

Figure 16:
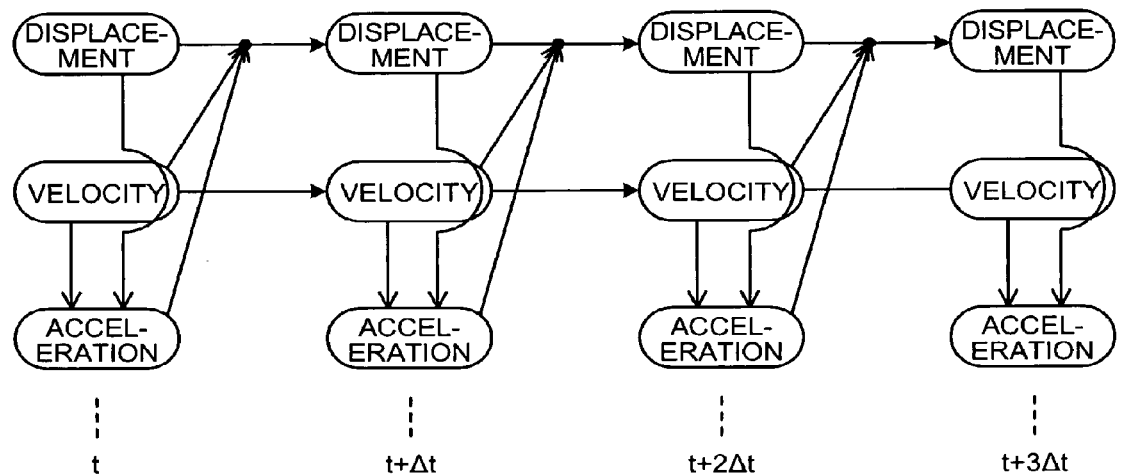
FIG. 16 is a diagram of the concept of the dynamic analysis process according to the second embodiment of the present invention.

The concept of dynamic analysis process in the second embodiment according to the present invention is shown in FIG. 16. FIG. 16 is a diagram of the concept of the dynamic analysis process according to the second embodiment of the present invention. Referring to FIG. 16, in the dynamic analysis process in the second embodiment according to the present invention, acceleration is calculated from the displacement and the velocity at time t, and using the velocity and the acceleration at time t displacement at time (t+Δt) after lapse of the analytical small time increment Δt is calculated.

In the first and the second embodiment analysis equation α(t)=f(x(t), v(t)) is applied for explanation, but it can also be α(t)=f(x(t)) without velocity term v(t). Also, analysis equation α(t) may include time term. Namely α(t) can be α(t)=f(x(t), v(t), t) or α(t)=f(x(t), t). Further, depending on the object of analysis, a plurality of analysis equations can be simultaneous equations. In other words, the analysis equations can be equations with multiple unknowns. By generalization these equations can be expressed as simultaneous differential equations below, $\alpha i(t)=f(x1(t), \ldots, xn(t), v1(t), \ldots, vn(t), t)$ where $i=1$ to n.

In the first and the second embodiments the dynamic analysis device is used as an example of the numerical analysis device for explanation, however, it can be applied not only to the dynamic analysis where time is a variable but also can be applied to a general numerical analysis. Namely the numerical analysis can be performed where the variable is not time t but temperature T or distance L. For example, a numerical analysis with temperature change can be performed when temperature T and analytical small temperature increment $\Delta T$ are applied instead of time t and analytical small time increment $\Delta t$.

Following are explained as examples of the first and the second embodiment: a dynamic analysis process of a spring-mass dashpot system, a dynamic analysis process of a transporting machine, a dynamic analysis process of a plurality of bodies of revolution connected by power transmission and the like, a dynamic analysis process of a speed governor, a dynamic analysis process of a cutting tool of a turning machine and the like, a dynamic analysis process of a reciprocating machine having a crank, a dynamic analysis process of a brake utilizing friction, a dynamic analysis process of a manipulator-like device connected with a rigid body link, a dynamic analysis process of particles or celestial bodies influencing force like gravity each other, a dynamic analysis process of a three-body problem of the Sun, the Earth and the Moon, a dynamic analysis process of surging characteristics of a system having a centrifugal pump, and a dynamic analysis process of current or electric charge generated in an electric or electronic circuit having inductance, capacitance, and resistance.

(First Application)

Figure 17:
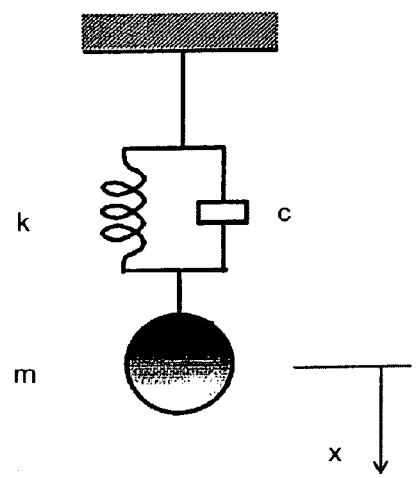
FIG. 17 is a schematic diagram of an outline of configuration of a spring-mass dashpot system to which dynamic analysis is applied.

FIG. 17 is a schematic diagram of an outline of configuration of a spring-mass dashpot system to which dynamic analysis is applied. The equation of motion specific for the spring-mass dashpot system is given as an equation (11) below.

$$m\alpha+cv+kx=f\cdot\sin((2\pi/T)\cdot t) \tag{11}$$

where,
m: mass of the mass point (1500.00),
c: viscous damping coefficient of the dashpot (4242.64),
k: spring coefficient (12000),
f: amplitude of the external force (1000.0),
T: period of the external force (1.00),
t: reference time,
x: displacement of the mass point,
v: velocity of the mass point,
$\alpha$: acceleration of the mass point,
$t_0$: beginning time of analysis,
$x_0$: initial displacement of the mass point (0.10),
$v_0$: initial velocity of the mass point (1.00),
$\alpha_0$: initial acceleration of the mass point,
and these are shown in the International System of Units.

In this case, the analysis equation is derived from the equation (11) and given as an equation (12) below.

$$\alpha(t)=(1/m)\cdot(f\cdot\sin((2\pi/T)\cdot t)-cv(t)-kx(t)) \tag{12}$$

$\alpha(t_0)$ is calculated by assigning parameters, $t=t_0$, $x(t_0)=x_0$, and $v(t_0)=v_0$ to the $\alpha(t)$ given by the equation (12), and $v(t+\Delta t)$ and $x(t+\Delta t)$ after lapse of the analytical small time increment $\Delta t(=0.01\text{ (s)})$ are calculated by the equations (2) and (3). Acceleration $\alpha(t+\Delta t)$ after lapse of the analytical small time increment $\Delta t$ using $v(t+\Delta t)$ and $x(t+\Delta t)$, and the process is repeated specified number of times.

Figure 18:
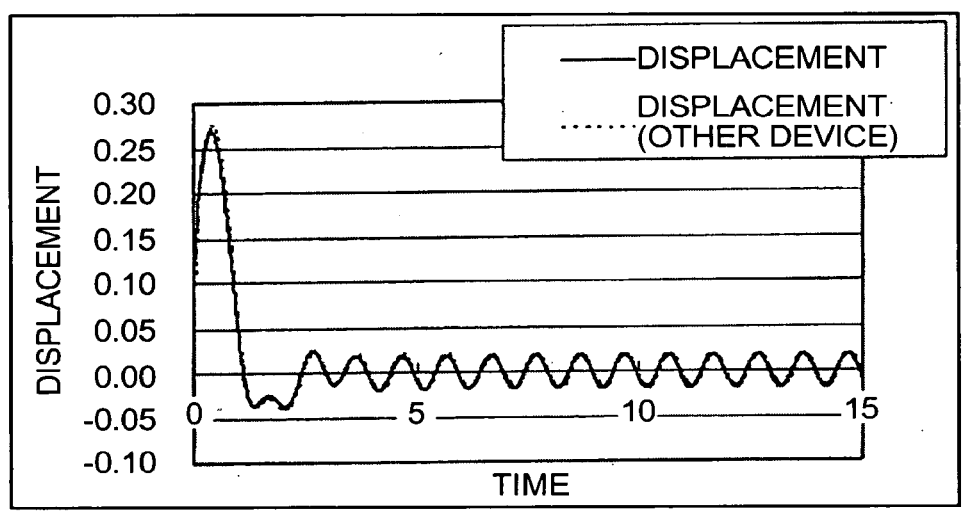
FIG. 18 is a graph of a dynamic analysis result of the mass-dashpot system shown in FIG. 17.

FIG. 18 a graph of a dynamic analysis result of the mass dashpot system shown in FIG. 17, and the horizontal axis indicates time and the vertical axis indicates displacement. From this dynamic analysis result, as shown in FIG. 18, almost the same dynamic characteristic has been obtained as the output result of the dynamic analysis device that performs time consuming analysis of high precision combining many processes like correction process including a feedback processing.

(Second Application)

Figure 19:
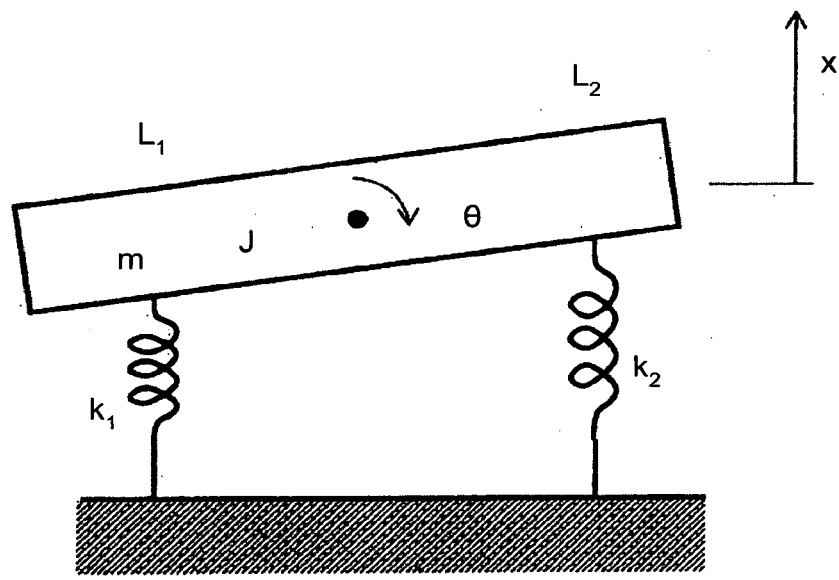
FIG. 19 is a schematic diagram of an outline of configuration of a transporting machine to which dynamic analysis is applied, accompanied by a simple harmonic motion and a rotational motion.

FIG. 19 is a schematic diagram of an outline of configuration of a transporting machine, to which the dynamic analysis is applied, accompanied by a simple harmonic motion and rotational motion. The equations of motion specific for this transporting machine are given as equations (13) and (14) below.

$$m\alpha+k_1(x+L_1\theta)+k_2(x-L_2\theta)=0 \tag{13}$$

$$J(d^2\theta/dt^2)+L_1k_1(x+L_1\theta)-L_2k_2(x-L_2\theta) \tag{14}$$

where,
m: mass of the transporting machine (1500.00),
J: moment of inertia of the transporting machine (3125),
$k_1$: first spring constant (3000),
$k_2$: second spring constant (3000),
$L_1$: first distance from the center of gravity (2.00),
$L_2$: second distance from the center of gravity (2.00),
x: displacement of the transporting machine (initial value $x_0=0.10$),
v: velocity of the transporting machine (initial value $v_0=0.00$),
$\alpha$: acceleration of the transporting machine,
$\theta$: angular displacement of the transporting machine (initial value $\theta_0=0.26$),
$\omega$: angular velocity of the transporting machine (initial value $\omega_0=0.00$),
$d^2\theta/dt^2$: angular acceleration of the transporting machine,
and these are shown in the International System of Units.

In this case, analysis equations are derived from the equations (13) and (14), and are given as equations (15) and (16) below.

$$\alpha(t)=-(k_1/m)(x(t)+L_1\theta(t))-(k_2/m)(x(t)-L_2\theta(t)) \tag{15}$$

$$(d^2\theta/dt^2)=-(L_1k_1/J)(x(t)+L_1\theta(t))+(L_2k_2/J)(x(t)-L_2\theta(t)) \tag{16}$$

Then $\alpha(t_0)$ and $d^2\theta/dt^2(t_0)$ are calculated by assigning parameters, initial displacement $v(t_0)=0.00$ and initial angular displacement $\theta_0(t_0)=0.25$ to the equations (15) and (16) respectively, further $x(t+\Delta t)$ and $\theta(t+\Delta t)$ after lapse of the analytical small time increment $\Delta t(=0.01\text{ (s)})$ are calculated by equation (10). Acceleration $\alpha(t+\Delta t)$ and $(d^2\theta(t+\Delta t)/dt^2)$ after the next lapse of the analytical small time increment $\Delta t$ are calculated using $x(t+\Delta t)$ and $\theta(t+\Delta t)$, and the process is repeated specified number of times. When the equations (2) and (3) are utilized as in the first embodiment, velocity of the transporting machine $v(t+\Delta t)$ and angular velocity of the transporting machine $\omega(t+\Delta t)$ are calculated by the equation (3). In this case initial velocity of the transporting machine $v(t_0)=0.00$ and angular velocity of the transporting machine is $\omega(t_0)=0.00$ are assumed.

Figure 20:
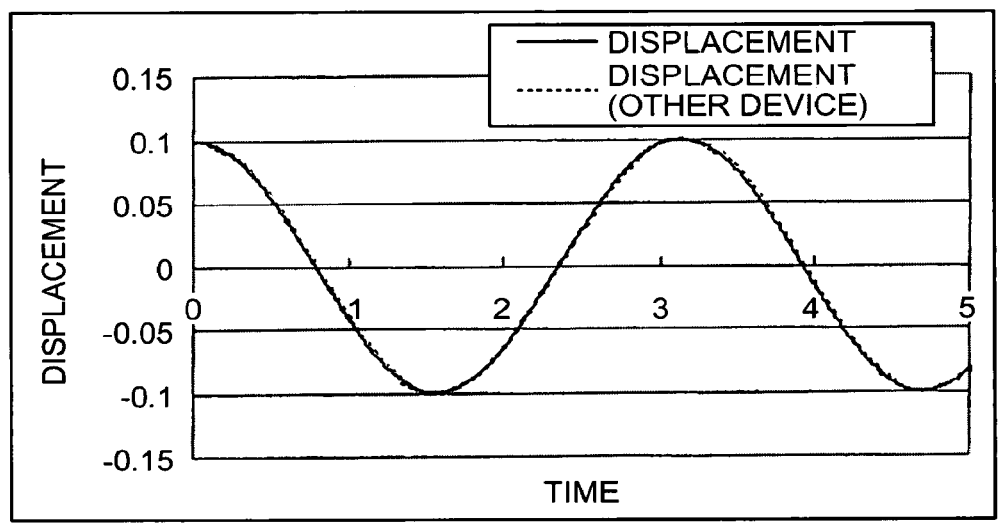
FIG. 20 is a graph of a dynamic analysis result of the displacement of the transporting machine shown in FIG. 19.
Figure 21:
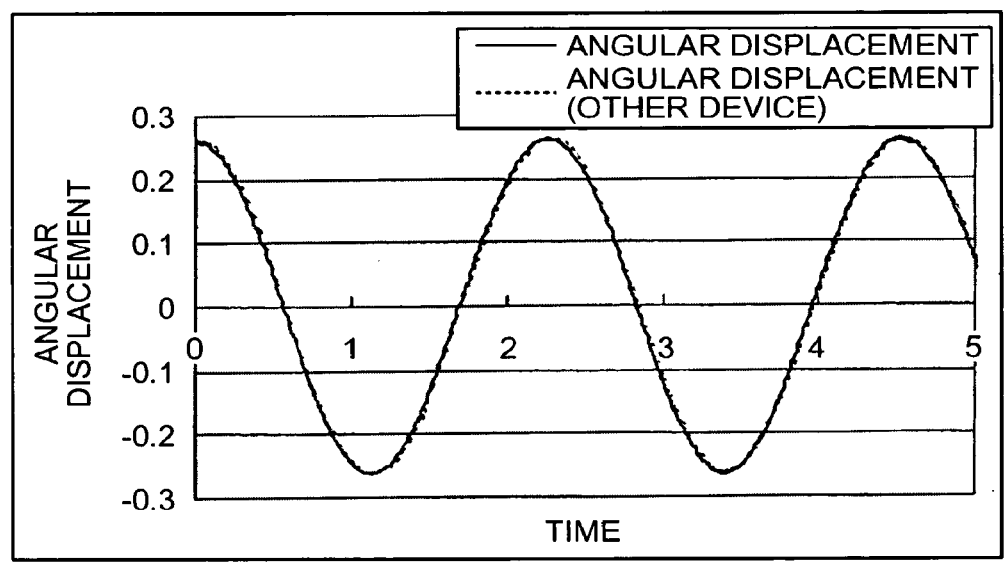
FIG. 21 is a graph of a dynamic analysis result of the angular displacement of the transporting machine shown in FIG. 19.

FIG. 20 is a graph of a dynamic analysis result of displacement of the transporting machine shown in FIG. 19, and FIG. 21 is a graph of a dynamic analysis result of angular displacement of the transporting machine shown in FIG. 19. From each dynamic analysis result, as shown in FIGS. 20 and 21, almost the same dynamic characteristics have been obtained as the output results of a dynamic analysis device that performs time consuming analysis of high precision combining many processes like correction process including the feedback processing.

(Third Application)

Figure 22:
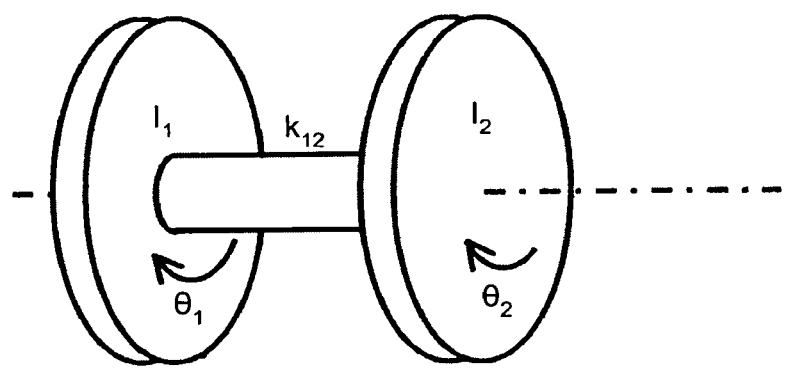
FIG. 22 is a schematic diagram of an outline of configuration of multiple bodies of revolution, to which dynamic analysis is applied, connected by a power transmission such as a torsion axis, joint and gear.

FIG. 22 is a schematic diagram of an outline of configuration of multiple bodies of revolution to which dynamic analysis is applied, connected by a power transmission such as a torsion axis, joint, and gear. The equations of motion for the object of analysis are given as equations (17) and (18) below.

$$I_1(d^2\theta_1/dt^2)+k_{12}(\theta_1-\theta_2)=0 \tag{17}$$

$$I_2(d^2\theta_2/dt^2)+k_{12}(\theta_2-\theta_1)=0 \tag{18}$$

where
$I_1$: moment of inertia of the first body of revolution (9500),
$I_2$: moment of inertia of the second body of revolution (53900),
$k_{12}$: torsion spring constant (98980000),
$\theta_1$: angular displacement of the first body of revolution (initial value=0.000),
$\theta_2$: angular displacement of the second body of revolution (initial value=0.026),
$\omega_1$: angular velocity of the first body of revolution (initial value=0.000),
($\theta_2$): angular velocity of the second body of revolution (initial value=0.000),
and these are shown in the International System of Units.

In this case, analysis equations are derived from the equations (17) and (18), and are given as equations (19) and (20) below.

$$(d^2\theta_1/dt^2)=-(k_{12}/I_1)\cdot(\theta_1-\theta_2) \tag{19}$$

$$(d^2\theta_2/dt^2)=-(k_{12}/I_2)\cdot(\theta_2-\theta_1) \tag{20}$$

$(d^2\theta_1/dt^2)$ and $(d^2\theta_2/dt^2)$ are respectively calculated assigning parameters, initial angular displacement $\theta_{10}=0.000$, initial angular displacement $\theta_{20}=0.026$ to the equations (19) and (20), then $\theta_1(t+\Delta t)$ and $\theta_2(t+\Delta t)$ after lapse of the analytical small time increment $\Delta t(=0.01$ (s)) are calculated by the equation (10). $(d^2\theta_1(t+\theta t)/dt^2)$ and $(d^2\theta_2(t+\Delta t)/dt^2)$ after lapse of the next analytical small time increment $\Delta t$ are calculated using $\theta_1(t+\Delta t)$ and $\theta_2(t+\Delta t)$, and the process is repeated specified number of times. When the equations (2) and (3) are utilized as in the first embodiment, angular velocity $\omega_1(t+\Delta t)$ and $\omega_2(t+\Delta t)$ are respectively calculated by the equation (3). Here initial angular velocity $\omega_1(t+\Delta t)=0.000$ and $\omega_2(t+\Delta t)=0.000$ are assumed.

Figure 23:
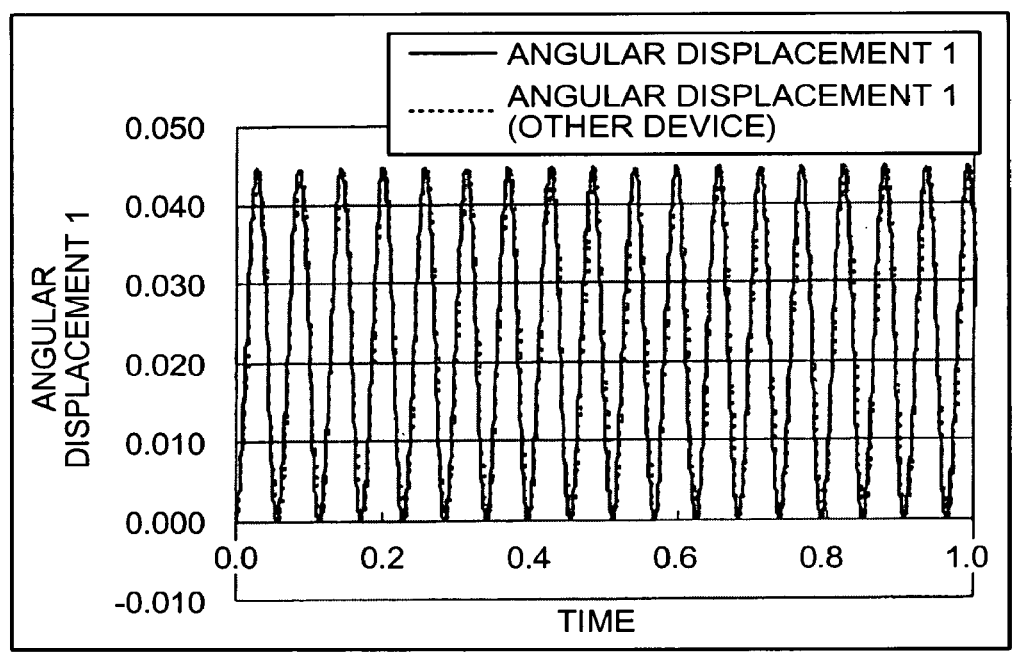
FIG. 23 is a graph of a dynamic analysis result of the angular displacement of each body of revolution connected by a power transmission shown in FIG. 22.
Figure 24:
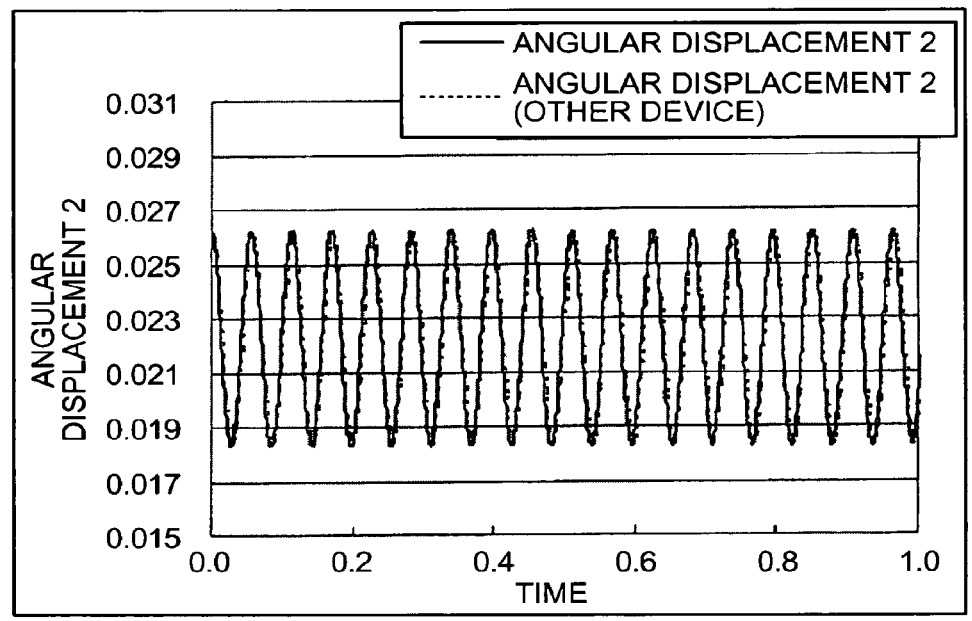
FIG. 24 is a graph of a dynamic analysis result of the angular displacement of each body of revolution connected by a power transmission shown in FIG. 22.

FIG. 23 and FIG. 24 are graphs of dynamic analysis results of the angular displacement of each body of revolution connected by a power transmission shown in FIG. 22. From each dynamic analysis result, as shown in FIGS. 23 and 24, almost the same dynamic characteristics have been obtained as the output results of a dynamic analysis device that performs time consuming analysis of high precision combining many processes like correction process including the feedback processing.

(Fourth Application)

Figure 25:
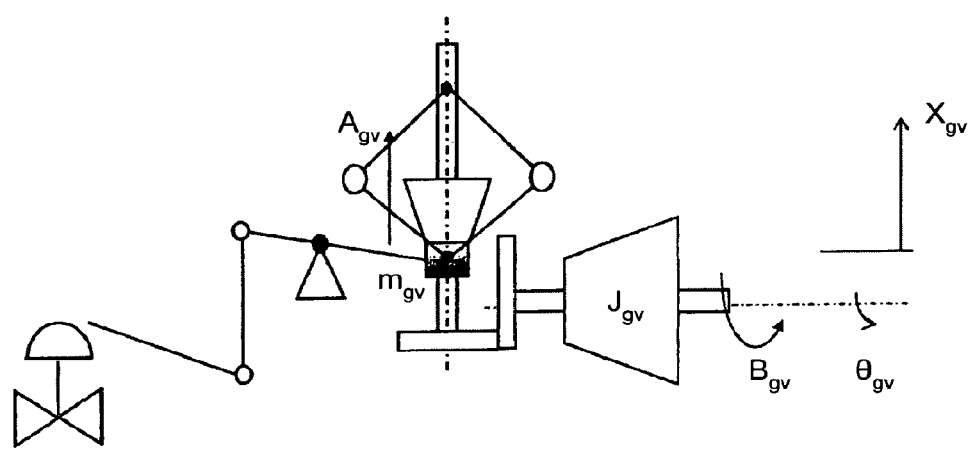
FIG. 25 is a schematic diagram of an outline of configuration of a slider for a speed governor and a turbine, to which dynamic analysis is applied.

FIG. 25 is a schematic diagram of an outline of configuration of a slider for a speed governor and a turbine, to which dynamic analysis is applied. The equations of motion specific for this speed governor are given as equations (21) and (22) below.

$$m_{gv}\alpha_{gv}+c_{gv}v_{gv}+k_{gv}x_{gv}=A_{gv}\omega_{gv} \tag{21}$$

$$J_{gv}(d^2\phi_{gv}/dt^2)=-B_{gv}x_{gv} \tag{22}$$

where
$m_{gv}$: equivalent mass of the slider for the speed governor (10.00),
$c_{gv}$: viscous damping coefficient of the speed governor (50.66),
$k_{gv}$: spring constant of the speed governor (1579.14),
$A_{gv}$: upward force working on the slider for the speed governor by every 1 rad/s increment of rotation of the turbine (10.00),
$J_{gv}$: equivalent moment of inertia of the turbine (2.50),
$B_{gv}$: increase of torque by every unit length descent of the slider for the speed governor (1000.00),
$x_{gv}$: displacement of the slider for the speed governor (initial value=0.00),
$v_{gv}$: velocity of the slider for the speed governor (initial value=0.00),
$\alpha_v$: acceleration of the slider for the speed governor,
$\phi_{gv}$: angular displacement of the turbine (initial value=0.00),
$\omega_{gv}$: angular velocity of the turbine (initial value=0.20), and these are shown in the International System of Units.

In this case, analysis equations are derived from the equations (21) and (22), and are given as equations (23) and (24) below.

$$\alpha_{gv}=(-c_{gv}v_{gv}-k_{gv}x_{gv}+A_{gv}\omega_{gv})/m_{gv} \tag{23}$$

$$(d^2\phi_{gv}/dt^2)=-(B_{gv}/J_{gv})\cdot x_{gv} \tag{24}$$

Acceleration $\alpha_{gv}$ and angular acceleration $(d^2\phi_{gv}/dt^2)$ are calculated assigning parameters, initial displacement $x_{gv}(t0)=0.00$, initial angular displacement $\phi_{gv}(t0)=0.00$, initial velocity $v_{gv}(t0)=0.00$, initial angular velocity $\omega_{gv}(t0)=0.20$ to the equations (23) and (24) respectively. Then velocity $v_{gv}(t+\Delta t)$ and $\omega_{gv}(t+\Delta t)$ after lapse of the analytical small time increment $\Delta t(=0.0005$ (s)) are calculated by the equation (2). Further displacement $x_{gv}(t+\Delta t)$ and angular displacement $\phi_{Gv}(t+\Delta t)$ after lapse of the analytical small time increment $\Delta t(=0.01$ (s)) are calculated by the equation (3) respectively. Acceleration $\alpha_{gv}(t+\Delta t)$ and angular acceleration $(d^2\phi_{gv}(t+\Delta t)/dt^2)$ after lapse of the analytical small time increment $\Delta t(=0.0005$ (s)) are calculated using the obtained $v_{gv}(t+\Delta t)$, $\omega_{gv}(t+\Delta t)$ $x_{gv}(t+\Delta t)$, and $\phi_{Gv}(t+\Delta t)$, and the process above is repeated specified number of times.

Figure 26:
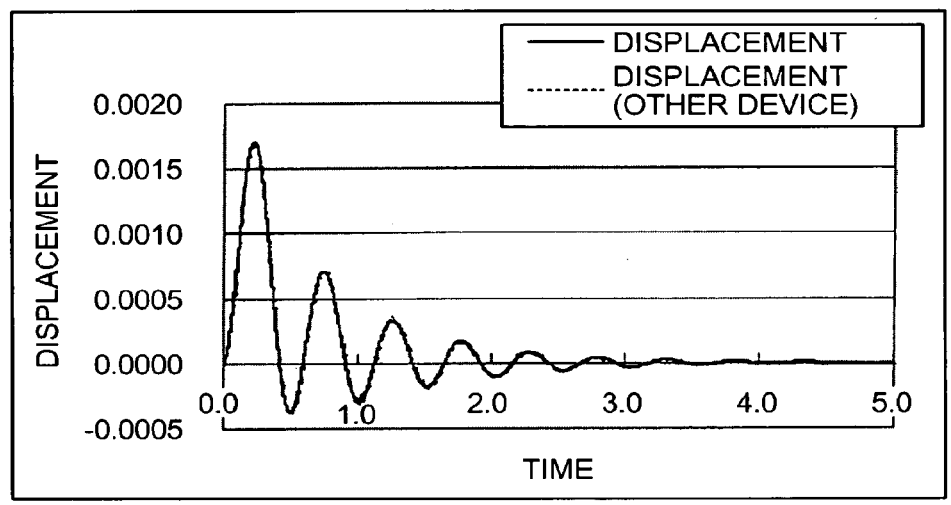
FIG. 26 is a graph of a dynamic analysis result of the displacement of the slider of the speed governor shown in FIG. 25.
Figure 27:
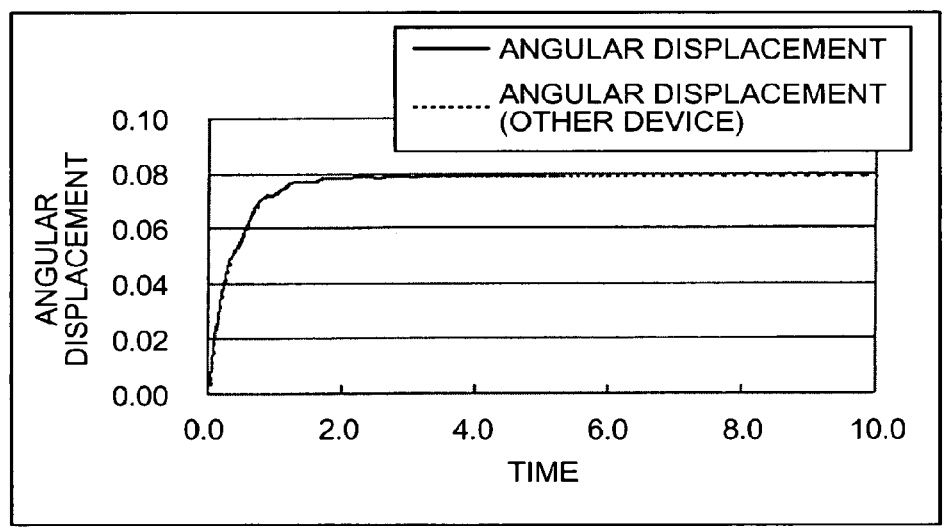
FIG. 27 is a graph of dynamic analysis result of the angular displacement of the turbine shown in FIG. 25.

FIG. 26 is a graph of a dynamic analysis result of the displacement of the slider for the speed governor shown in FIG. 25, and FIG. 27 is a graph of a dynamic analysis result of the angular displacement of the turbine shown in FIG. 25. From each dynamic analysis result, as shown in FIGS. 26 and 27, almost the same dynamic characteristics have been obtained as the output results of a dynamic analysis device that performs time consuming analysis of high precision combining many processes like correction process including the feedback processing.

(Fifth Application)

Figure 28:
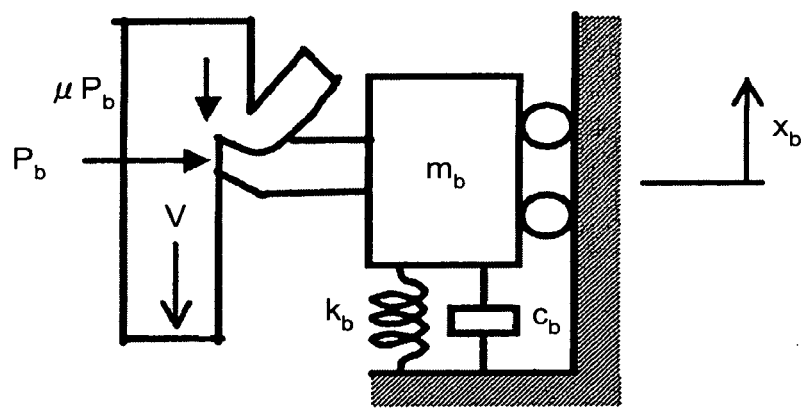
FIG. 28 is a schematic diagram of an outline of configuration of a cutting tool of a turning machine such as a lathe, to which dynamic analysis is applied.

FIG. 28 is a schematic diagram of an outline of configuration of a cutting tool of a turning machine such as a lathe, to which the dynamic analysis is applied. The equation of motion specific for the cutting tool is given as an equation (25) below.

$$m_b\alpha_b+c_bv_b+k_bx_b=\mu(V-v_b)P_b \tag{25}$$

where,
$m_b$: mass of the cutting tool (10.00),
$c_b$: viscous damping coefficient (20.00),
$k_b$: spring constant (1000.00),
V: cutting speed (2.00),
$P_b$: radial force (100.00),
$x_b$: displacement of the cutting tool (initial value=0.00),
$v_b$: velocity of the cutting tool (initial value=1.00), $\alpha_b$: acceleration of the cutting tool, $\mu(V-v_b)$: $0.0075 (V-v_b)^2 - 0.055(V-v_b) + 0.400$, and these are shown in the International System of Units.

In this case, analysis equation is derived from the equation (25) and is given as an equation (26) below.

$$\alpha_b = (-c_b v_b - k_b x_b + \mu(V-v_b)P_b)/m_b \quad (26)$$

Acceleration $\alpha_b$ is calculated assigning parameters, initial displacement $x_b(t_0)=0.00$, initial velocity $v_b(t_0)=1.00$ to the equation (26). Then velocity $v_b(t+\Delta t)$ after lapse of the analytical small time increment $\Delta t(=0.02\ (s))$ is calculated by the equation (2). Further displacement $x_b(t+\Delta t)$ after lapse of the analytical small time increment $\Delta t(=0.02\ (s))$ is calculated by the equation (3). Acceleration $\alpha_b(t+\Delta t)$ after lapse of the analytical small time increment $\Delta t(=0.02\ (s))$ is calculated using these obtained $v_b(t+\Delta t)$ and $x_b(t+\Delta t)$, and the process is repeated specified number of times.

Figure 29:
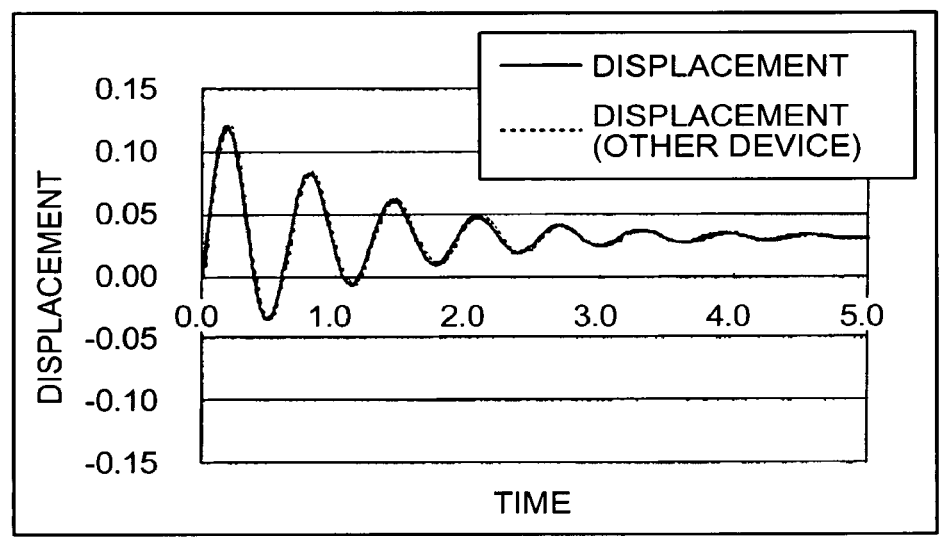
FIG. 29 is a graph of dynamic analysis result of the displacement of a cutting tool of a turning machine such as a lathe shown in FIG. 28.

FIG. 29 is a graph of a dynamic analysis result of the displacement of the cutting tool of the turning machine such as a lathe shown in FIG. 28. From this dynamic analysis result, as shown in FIG. 29, almost the same dynamic characteristic has been obtained as the output result of a dynamic analysis device that performs time consuming analysis of high precision combining many processes like correction process including the feedback processing.

(Sixth Application)

Figure 30:
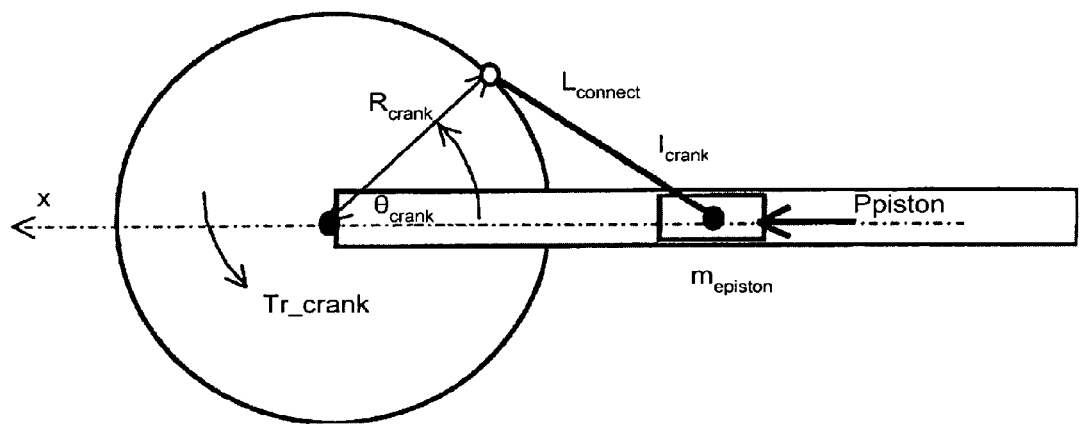
FIG. 30 is a schematic diagram of an outline of configuration of a reciprocating machine, to which dynamic analysis is applied, having a crank.

FIG. 30 is a schematic diagram of an outline of configuration of a reciprocating machine, to which the dynamic analysis is applied, with a crank. The equation of motion specific for the reciprocating machine with a crank is given as the equation (27) below.

$$\left(I_{cr} + m_{pi}R_{cr}^2(\sin\theta_{cr} + (\varepsilon/2)\sin 2\theta_{cr})^2\right)\left(\frac{d^2\theta_{cr}}{dt^2}\right) =$$
$$-m_{pi}R_{cr}^2(\sin\theta_{cr} + (\varepsilon/2)\sin 2\theta_{cr})(\cos\theta_{cr} + \varepsilon\cos 2\theta_{cr})\left(\frac{d\theta_{cr}}{dt}\right)^2 -$$
$$(Tr_{cr} + P_{pi}R_{cr}(\sin\theta_{cr} + (\varepsilon/2)\sin 2\theta_{cr})) \quad (27)$$

where, $m_{pi}$: reciprocating mass (15.00), $I_{cr}$: moment of inertia of total rotating mass around the crankshaft (7.73), $R_{cr}$: arm length of the crankshaft (0.13), $\varepsilon$: $R_{cr}/L_{con}$, $L_{con}$: length of the connection (0.25), $P_{pi}$: external force (0.00), $Tr_{cr}$: resistive torque (1.00)

$\theta_{cr}$: angular displacement of the crank (initial value=0.26), $d\theta_{cr}/dt$: angular velocity of the crank (initial value=12.57), and these are shown in the International System of Units.

In this case the analysis equation is derived from the equation (27) and is given as equation (28) below.

$$(d^2\theta_{cr}/dt^2) = -\{m_{pi}R_{cr}^2(\sin\theta_{cr}+(\varepsilon/2)\sin 2\theta_{cr})(\cos\theta_{cr}+\varepsilon\cos 2\theta_{cr})(d\theta_{cr}/dt)^2\}/(I_{cr}+m_{pi}R_{cr}^2(\sin\theta_{cr}+(\varepsilon/2)\sin 2\theta_{cr})^2) - \{(Tr_{cr}+P_{pi}R_{cr}(\sin\theta_{cr}+(\varepsilon/2)\sin 2\theta_{cr}))\}/(I_{cr}+m_{pi}R_{cr}^2(\sin\theta_{cr}+(\varepsilon/2)\sin 2\theta_{cr})^2) \quad (28)$$

Angular acceleration $(d^2\theta_{cr}/dt^2)$ is calculated assigning parameters, initial angular displacement $\theta_{cr}(t_0)=0.26$, and initial angular velocity $(d\theta_{cr}/dt(t_0))=12.57$ to the equation (28). Then angular velocity $(d\theta_{cr}(t+\Delta t)/dt)$ after lapse of the analytical small time increment $\Delta t(=0.001\ (s))$ is calculated by the equation (2). Further angular displacement $\theta_{cr}(t+\Delta t)$ after lapse of the analytical small time increment $\Delta t(=0.001\ (s))$ is calculated by the equation (3). Angular acceleration $(d^2\theta_{cr}(t+\Delta t)/dt^2)$ after lapse of the analytical small time increment $\Delta t(=0.001\ (s))$ is calculated using these obtained $(d\theta_{cr}(t+\Delta t)/dt)$ and $\theta_{cr}(t+\Delta t)$, and the process is repeated specified number of times.

Figure 31:
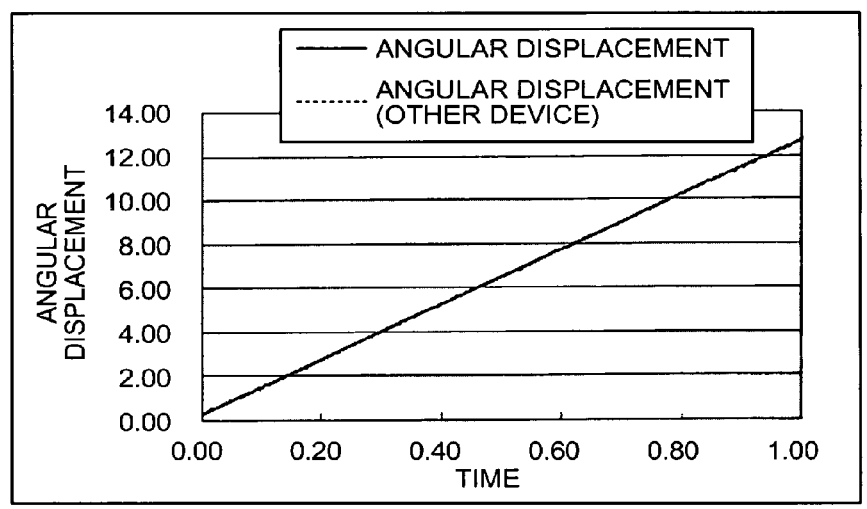
FIG. 31 is a graph of a dynamic analysis result of the reciprocating machine having a crank shown in FIG. 30.

FIG. 31 is a graph of a dynamic analysis result of the reciprocating machine with a crank shown in FIG. 30.

From this dynamic analysis result, as shown in FIG. 31, almost the same dynamic characteristic has been obtained as the output result of a dynamic analysis device that performs time consuming analysis of high precision combining many processes like correction process including the feedback processing.

Figure 32:
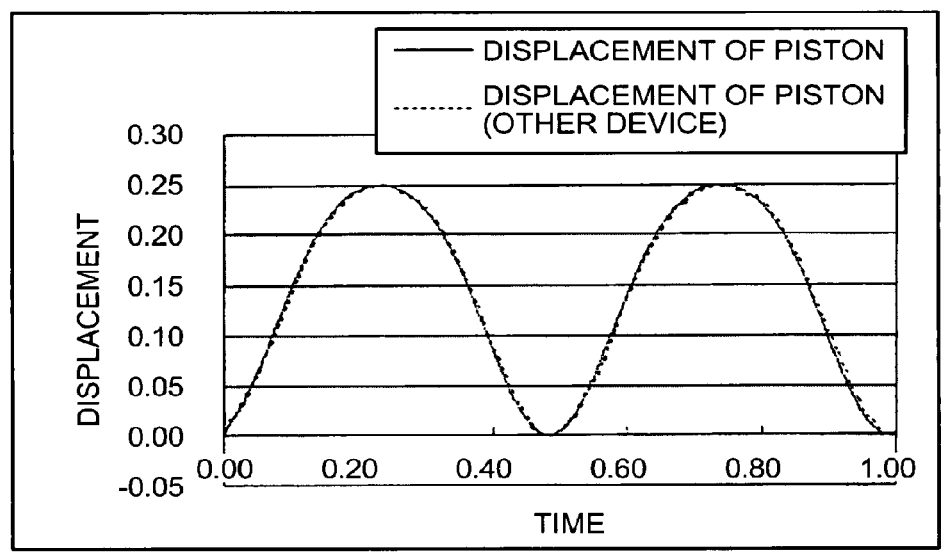
FIG. 32 is a graph of a dynamic analysis result of the piston of the reciprocating machine having a crank shown in FIG. 30.

The displacement of the piston can structurally be obtained from the crank angle and other parameters as shown in an equation (29) below.

$$x_{pi} = (R_{cr} + L_{con}) - (R_{cr}\cos\theta_{cr} + L_{con}(1-\varepsilon^2\sin^2\theta_{cr})^{1/2}) \quad (29)$$

where, $x_{pi}$: displacement of the piston, $R_{cr}$: arm length of the crankshaft (0.13), $\varepsilon$: $R_{cr}/L_{con}$, $L_{con}$: length of the connection (0.25), $\theta_{cr}$: angular displacement of the crank, and these are shown in the International System of Units. FIG. 32 is a graph of a dynamic analysis result of the piston of the reciprocating machine with the crank obtained from the equation (29). From this dynamic analysis result, as shown in FIG. 32, almost the same dynamic characteristic has been obtained as the output result of a dynamic analysis device that performs time consuming analysis of high precision combining many processes like correction process including the feedback processing.

(Seventh Application)

Figure 33:
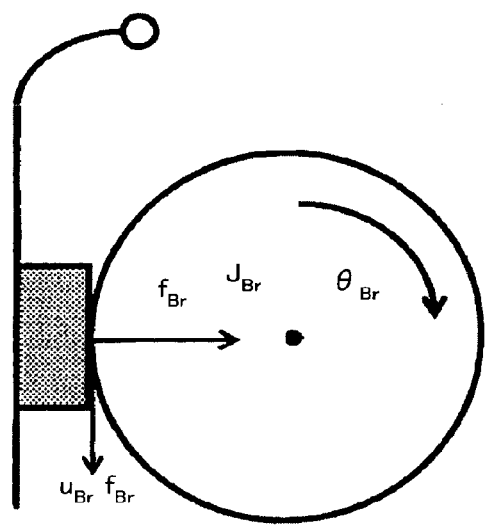
FIG. 33 is a schematic diagram of an outline of configuration of a brake disc to which dynamic analysis is applied.

FIG. 33 is a schematic diagram of an outline of configuration of a brake disc to which the dynamic analysis is applied. The equation of motion specific for the brake disc is given as an equation (30) below.

$$J_B(d^2\theta_B/dt^2) = -u_B f_B \quad (30)$$

where, $J_B$: moment of inertia of the brake disc (3.00), $f_B$: press force (500.00), $u_B$: friction coefficient (0.30), $\theta_B$: angular displacement of the brake disc (initial value=0.00), $d\theta_B(t)/dt$: angular velocity of the brake disc (initial value=139.63), and these are shown in the International System of Units.

In this case, the analysis equation is derived from the equation (30) and is given as an equation (31) below.

$$(d^2\theta_B/dt^2) = -u_B f_B/J_B \quad (31)$$

Angular acceleration $(d^2\theta_B/dt^2(t_0))$ is calculated assigning parameters, initial angular displacement $\theta_B(t_0)=0.00$, and initial angular velocity $(d\theta_B/dt(t_0))=139.63$ to the equation (30). Then angular velocity $(d\theta_B(t+\Delta t)/dt)$ after lapse of the analytical small time increment $\Delta t (=0.01\ (s))$ is calculated by the equation (2). Further angular displacement $\theta_B(t+\Delta t)$ after lapse of the analytical small time increment $\Delta t (=0.01\ (s))$ is calculated by the equation (3). Angular acceleration $(d^2\theta_B(t+\Delta t)/dt^2)$ after lapse of the analytical small time increment $\Delta t(=0.01\ (s))$ is calculated using these obtained $(d\theta_B(t+\Delta t)/dt)$ and $\theta_B(t+\Delta t)$, and the process is repeated specified number of times.

Figure 34:
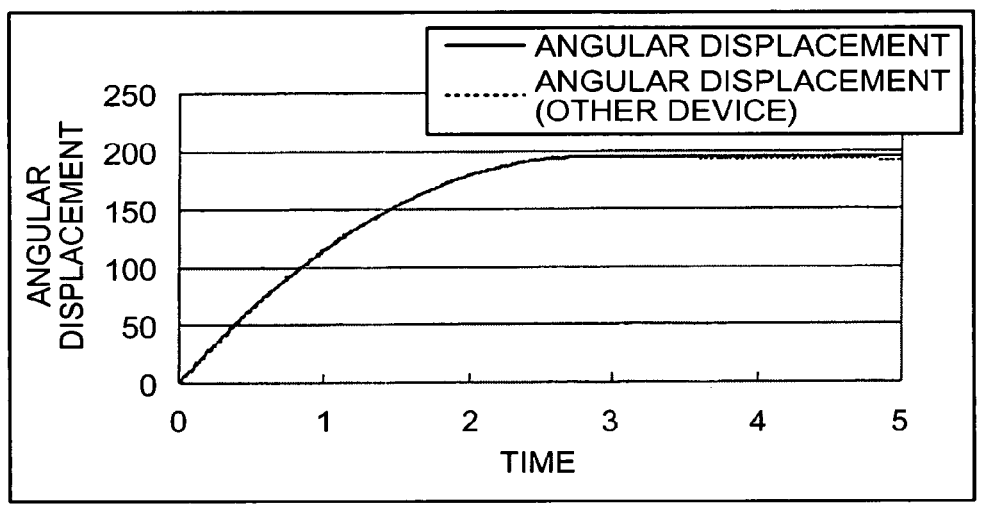
FIG. 34 is a graph of dynamic analysis result of the brake disc shown in FIG. 33.

FIG. 34 is a graph of a dynamic analysis result of the brake disc shown in FIG. 33. From this dynamic analysis result, as shown in FIG. 34, almost the same dynamic characteristic has been obtained as the output result of a dynamic analysis device that performs time consuming analysis of high precision combining many processes like correction process including the feedback processing.

(Eighth Application)

Figure 35:
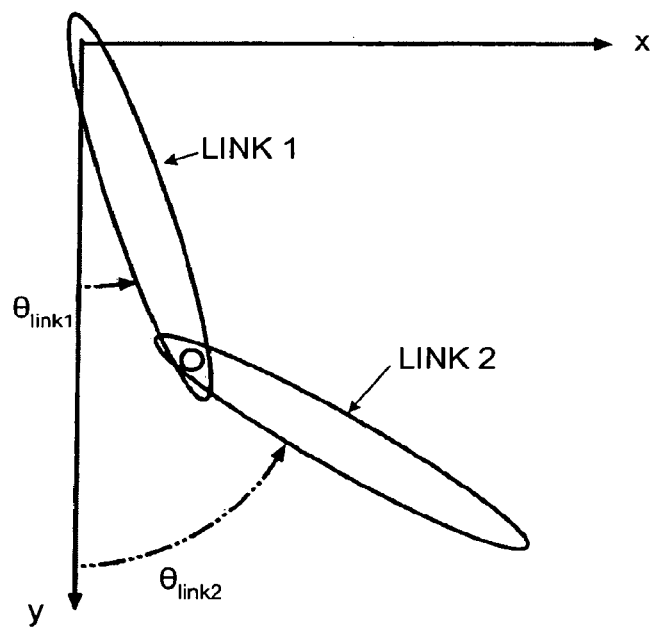
FIG. 35 is a schematic diagram of an outline of configuration of a manipulator-like device, to which dynamic analysis is applied, connected by a rigid body link.

FIG. 35 is a schematic diagram of an outline of configuration of a manipulator-like device, to which the dynamic analysis is applied, connected by a rigid body link. The equations of motion specific for the manipulator-like device connected by a rigid body link are given as equations (32) and (33) below.

$$(4/3)(d^2\theta_{link1}/dt^2)+(1/2)(d^2\theta_{link2}/dt^2)\cos(\theta_{link1}-\theta_{link2})-(1/2)(d\theta_{link2}/dt)^2\sin(\theta_{link2}-\theta_{link1})+(3/2)(g/L_{link})\sin\theta_{link1}=0 \quad (32)$$

$$(1/3)(d^2\theta_{link2}/dt^2)+(1/2)(d^2\theta_{link1}/dt^2)\cos(\theta_{link2}-\theta_{link1})+(1/2)(d\theta_{link1}/dt)^2\sin(\theta_{link2}-\theta_{link1})+(1/2)(g/L_{link})\sin\theta_{link2}=0 \quad (33)$$

where,
$L_{link}$ length of link 1 and link 2 (5.000),
g: acceleration of gravity (9.807),
$\theta_{link1}$: angular displacement of link 1 (initial value=0.087),
$d\theta_{link1}/dt$: angular velocity of link 1 (initial value=0.000),
$\theta_{link2}$: angular displacement of link 2 (initial value=−0.087),
$d\theta_{link2}/dt$: angular velocity of link 2 (initial value=0.000),
and these are shown in the International System of Units.

In this case, analysis equations are derived from the equations (32) and (33) and are given as equations (34) and (35) below.

$$\left(\frac{d^2\theta_{link1}}{dt^2}\right) = (1/(4/3 - (3/4)\cos^2(\theta_{link2} - \theta_{link1}))) \cdot \left\{(3/4)\left(\frac{d\theta_{link1}}{dt}\right)^2 \cos(\theta_{link2} - \theta_{link1})\sin(\theta_{link2} - \theta_{link1}) + (1/2)\left(\frac{d\theta_{link2}}{dt}\right)^2 \sin(\theta_{link2} - \theta_{link1}) + (3g/4L_{link})(\sin\theta_{link2}\cos(\theta_{link2} - \theta_{link1}) - 2\sin\theta_{link1})\right\} \quad (34)$$

$$\left(\frac{d^2\theta_{link2}}{dt^2}\right) = (1/(1/3 - (3/16)\cos^2(\theta_{link2} - \theta_{link1}))) \cdot \left\{-(1/2)\left(\frac{d\theta_{link1}}{dt}\right)^2 \sin(\theta_{link2} - \theta_{link1}) - (3/16)\left(\frac{d\theta_{link2}}{dt}\right)^2 \cos(\theta_{link2} - \theta_{link1})\sin(\theta_{link2} - \theta_{link1}) + (9g/16L_{link})(\sin\theta_{link2}\cos(\theta_{link2} - \theta_{link1})(8/9)\sin\theta_{link2})\right\} \quad (35)$$

Angular acceleration $(d^2\theta_{link1}/dt^2(t_0))$ and $(d^2\theta_{link2}/dt^2(t_0))$ are calculated assigning parameters, initial angular displacement $\theta_{link1}(t_0)=0.087$, initial angular displacement $\theta_{link2}(t_0)=-0.087$, initial angular velocity $(d\theta_{link1}/dt(t_0))=0.000$, and initial angular velocity $(d\theta_{link2}/dt(t_0))=0.000$ to the equations (34) and (35). Then angular velocity $(d\theta_{link1}(t+\Delta t)/dt)$ and $(d\theta_{link2}(t+\Delta t)/dt)$ after lapse of the analytical small time increment $\Delta t(=0.01$ (s)) are calculated by the equation (2). Further angular displacement $\theta_{link1}(t+\Delta t)$ and $\theta_{link2}(t+\Delta t)$ after lapse of the analytical small time increment $\Delta t(=0.01$ (s)) are calculated by the equation (3). Angular acceleration $(d^2\theta_{link1}(t+\Delta t)/dt^2)$ and $(d^2\theta_{link2}(t+\Delta t)/dt^2)$ after lapse of the analytical small time increment $\Delta t(=0.01$ (s)) are calculated using these obtained $(d\theta_{link1}(t+\Delta t)/dt)$, $(d\theta_{link2}(t+\Delta t)/dt)$, $\theta_{link1}(t+\Delta t)$, and $\theta_{link2}(t+\Delta t)$, and the process is repeated specified number of times.

Figure 36:
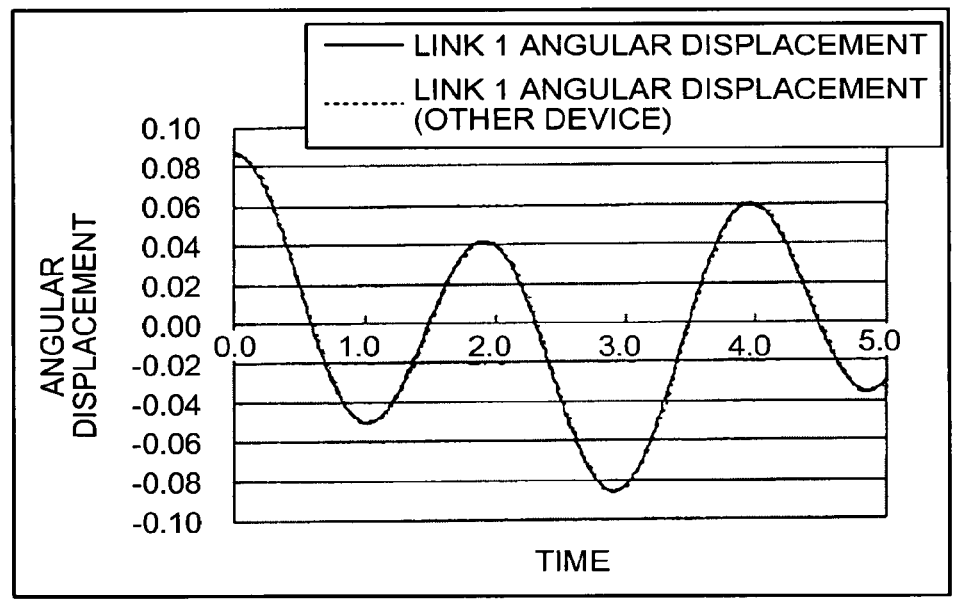
FIG. 36 is a graph of dynamic analysis result of the manipulator-like device connected by a rigid body link shown in FIG. 35.
Figure 37:
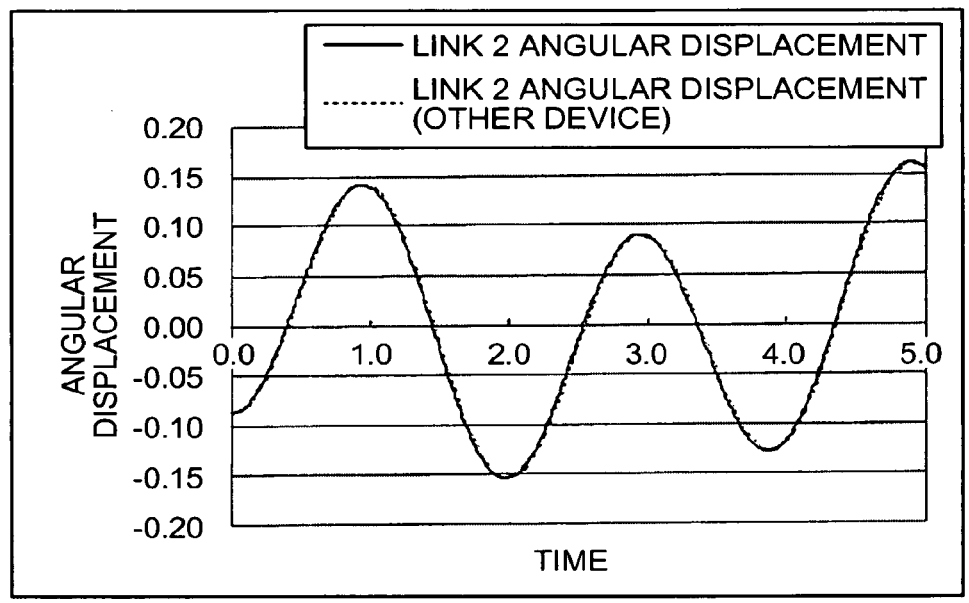
FIG. 37 is a graph of a dynamic analysis result of the manipulator-like device connected by a rigid body link shown in FIG. 35.

FIGS. 36 and 37 are graphs of dynamic analysis results of the manipulator-like device connected by rigid body link shown in FIG. 35. From each dynamic analysis results, as shown in FIGS. 36 and 37, almost the same dynamic characteristics have been obtained as the output results of a dynamic analysis device that performs time consuming analysis of high precision combining many processes like correction process including the feedback processing.

In the equations (32) and (33), when angular displacements $\theta_{link1}$ and $\theta_{link2}$ are small, the equations (34) and (35) can be approximated equations (36) and (37) as below.

$$\left(\frac{d^2\theta_{link1}(t)}{dt^2}\right) \approx (12g/7L_{link})((3/4)\theta_{link2} - (3/2)\theta_{link1}) \quad (36)$$

$$\left(\frac{d^2\theta_{link2}(t)}{dt^2}\right) \approx (48g/7L_{link})((9/16)\theta_{link1} - (1/2)\theta_{link2}) \quad (37)$$

These equations can give almost same results as those shown in FIGS. 36 and 37. In this case, the similar process to that in the second embodiment can be applied.

(Ninth Application)

Figure 38:
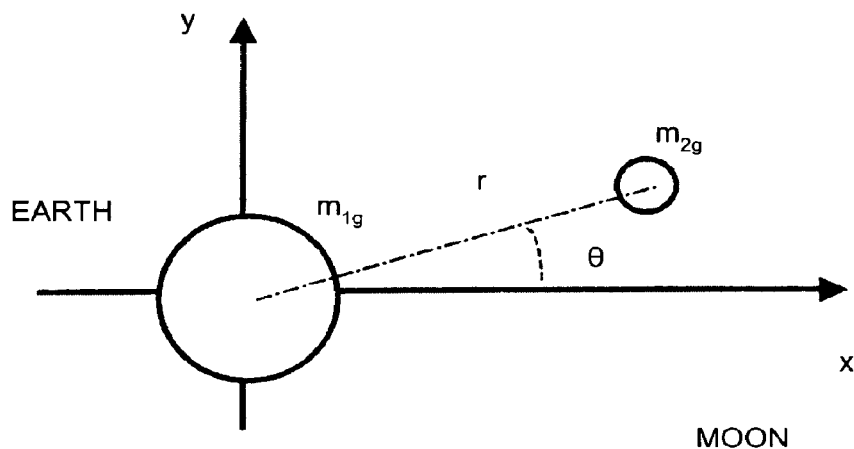
FIG. 38 is a schematic diagram of an outline of configuration of particles or celestial bodies, to which dynamic analysis is applied, that influence forces like gravity each other.

FIG. 38 is a schematic diagram of an outline of configuration of particles or celestial bodies, to which the dynamic analysis is applied, influencing force like gravity each other. The equations of motion specific for these particles or celestial bodies influencing force like gravity each other are given as equations (38) to (41) below.

$$m_{1g}\alpha_{x1}=G(m_{1g}m_{2g}/r^2)\cos\theta \quad (38)$$

$$m_{1g}\alpha_{y1}=G(m_{1g}m_{2g}/r^2)\sin\theta \quad (39)$$

$$m_{1g}\alpha_{x2}=-G(m_{1g}m_{2g}/r^2)\cos\theta \quad (40)$$

$$m_{1g}\alpha_{x2-}=G(m_{1g}m_{2g}/r^2)\sin\theta \quad (41)$$

where,
$m_{1g}$: mass of the Earth ($5.97\times10^{24}$),
$m_{2g}$: mass of the Moon ($7.35\times10^{22}$),
G: gravitational constant ($6.67\times10^{-11}$),
$\alpha_{x1}$: acceleration of the Earth in x direction,
$\alpha_{y1}$: acceleration of the Earth in y direction,
$\alpha_{x2}$: acceleration of the Moon in x direction,
$\alpha_{y2}$: acceleration of the Moon in y direction,
r: distance between the Earth and the Moon,
and these are shown in the International System of Units.

The r, $\cos\theta$, and $\sin\theta$ in equations (38) to (41) are defined in the equations (42) to (44) below.

$$r=\sqrt{((x_1-x_2)^2+(y_1-y_2)^2)} \quad (42)$$

$$\cos\theta=|x_1-x_2|/r \quad (43)$$

$$\sin\theta=|y_1-y_2|/r \quad (44)$$

where,
$x_1$: displacement of the Earth in x direction (initial value=$0.00\times10^{00}$),
$x_2$: displacement of the Earth in y direction (initial value=$0.00\times10^{00}$),
$y_1$: displacement of the Moon in x direction (initial value=$3.84\times10^{08}$),
$y_2$: displacement of the Moon in y direction (initial value=$0.00\times10^{00}$),
$v_{x1}$: velocity of the Earth in x direction (initial value=$0.00\times10^{00}$),
$v_{y1}$: velocity of the Earth in y direction (initial value=$0.00\times10^{00}$), $v_{x2}$: velocity of the Moon in x direction (initial value=3.84×$10^{00}$), and $v_{y2}$: velocity of the Moon in y direction (initial value=1.04×$10^{03}$)

In this case, analysis equations are derived from the equations (38) to (41) and are given as equations (45) to (48) below.

$$\alpha_{x1}=G(m_{2g}/r^2)\cos\theta \tag{45}$$

$$\alpha_{y1}=G(m_{2g}/r^2)\sin\theta \tag{46}$$

$$\alpha_{x2}=-G(m_{1g}/r^2)\cos\theta \tag{47}$$

$$\alpha_{y2}=-G(m_{1g}/r^2)\sin\theta \tag{48}$$

Acceleration $\alpha_{x1}$, $\alpha_{y1}$, $\alpha_{x2}$, and $\alpha_{y2}$ are calculated assigning parameters, initial displacement of the Earth in x direction $x_1(t_0)$=0.00×$10^{00}$, initial displacement of the Earth in y direction $y_1(t_0)$=0.00×$10^{00}$, initial displacement of the Moon in x direction $x_2(t_0)$=3.84×$10^{080}$, and initial displacement of the Moon in y direction $y_2(t_0)$=0.00×$10^{00}$ to the equations (45) to (48). Then velocity $v_{x1}(t+\Delta t)$, $v_{y1}(t+\Delta t)$, $v_{x2}(t+\Delta t)$, and $v_{y2}(t+\Delta t)$ after lapse of the analytical small time increment $\Delta t(=0.01$ (s)) are calculated by the equation (2). Further displacement $x_1(t+\Delta t)$, $x_2(t+\Delta t)$, $y_1(t+\Delta t)$, and $y_2(t+\Delta t)$ after lapse of the analytical small time increment $\Delta t(=0.01$ (s)) are calculated by the equation (3). Acceleration $\alpha_{x1}(t+\Delta t)$, $\alpha_{y1}(t+\Delta t)$ $\alpha_{x2}(t+\Delta t)$, and $\alpha_{y2}(t+\Delta t)$ after lapse of the analytical small time increment $\Delta t(=0.01$ (s)) are calculated using these obtained $v_{x1}(t+\Delta t)$, $v_{y1}(t+\Delta t)$ $v_{x2}(t+\Delta t)$, $v_{y2}(t+\Delta t)$, $x_1(t+\Delta t)$, $x_2(t+\Delta t)$, $y_1(t+\Delta t)$, and $y_2(t+\Delta t)$, and the process is repeated specified number of times.

Figure 39:
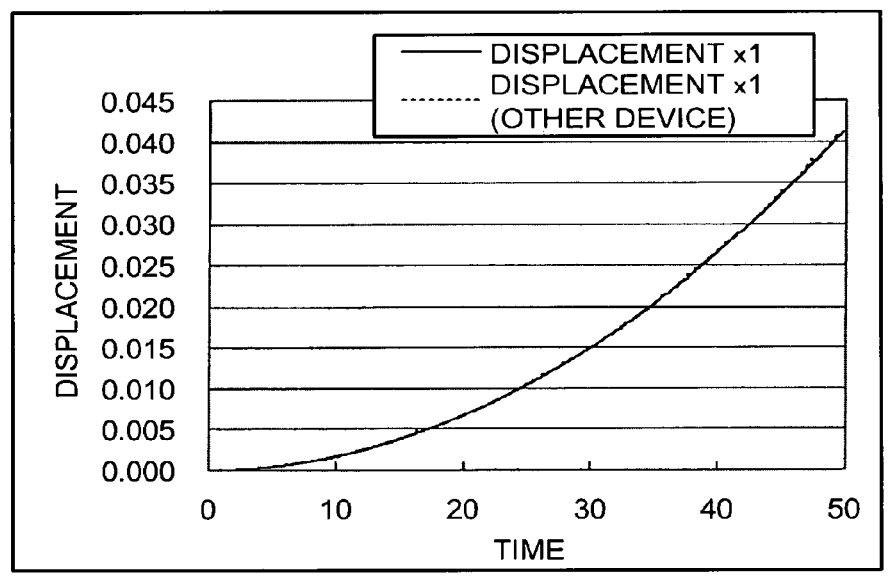
FIG. 39 is a graph of a dynamic analysis result of the displacement in x direction of the Earth shown in FIG. 38.

FIG. 39 is a graph of a dynamic analysis result of displacement of the Earth in x direction shown in FIG. 38. From this dynamic analysis result, as shown in FIG. 39, almost the same dynamic characteristic has been obtained as the output result of a dynamic analysis device that performs time consuming analysis of high precision combining many processes like correction process including the feedback processing.

(Tenth Application)

The present invention can process a numerical analysis of high precision about three-body problem in a short period of time. Three-body problem means a problem to solve behavior of each of three existing bodies using universal gravitation, and here dynamic analysis is applied to the Sun, the Earth, and the Moon respectively.

Figure 40:
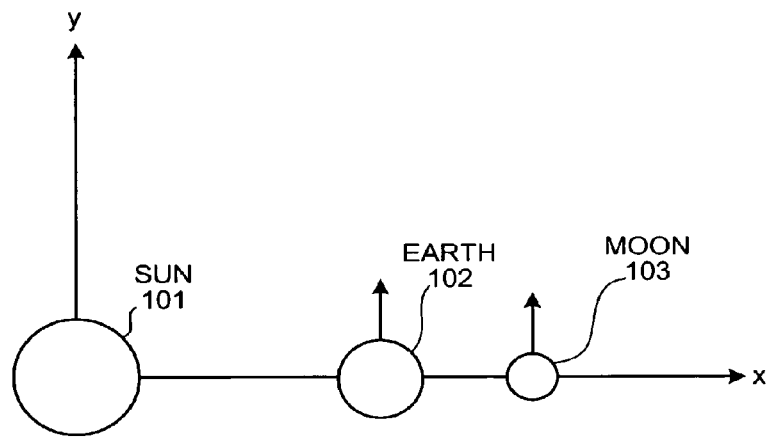
FIG. 40 is a diagram of a coordinate system and configuration relationship to analyze three-body problem of the Sun, the Earth and the Moon.

FIG. 40 is a diagram of configuration relationship to analyze three-body problem of the Sun, the Earth, and the Moon. Analysis is performed assuming the Sun 101, the Earth 102, and the Moon 103 move in the identical x-y plane (orbital plane of the Earth).

The equation of motion for the Sun 101 is given as below.

$$F1=M_1 * a_1 \tag{49}$$

where $M_1$ is the mass of the Sun 101 and $a_1$ is an acceleration of the Sun 101. Here $a_1$ is a vector $a_1(a_{x1}, a_{y1})$. Universal gravitation $f_{12}$ by the Earth 102 is given as below.

$$f_{12}=\{G \cdot M_2 \cdot M_1/(|P_2-P_1|^2)\} * \{(P_2-P_1)/|P_2-P_1|\} \tag{50}$$

where G is universal gravitation constant, $M_2$ is the mass of the Earth 102, $P_1$ and $P_2$ are position vectors $P_1(x_1,y_1)$ and $P_2(x_2,y_2)$ of the Sun 101 and the Earth 102, respectively. Universal gravitation $f_{12}$ is a vector. Here $\{G \cdot M_2 \cdot M_1/(|P_2-P_1|^2)\}$ means absolute value of universal gravitation and $\{(P_2-P_1)/|P_2-P_1|\}$ means unit vector from the Sun 101 to the Earth 102.

An equation (50) can be transformed into the equation below.

$$f_{12}=\{G \cdot M_2 \cdot M_1/(|P_2-P_1|^3)\} * (P_2-P_1) \tag{51}$$

Similarly, the universal gravitation constant by the Moon 103 is given as below.

$$f_{13}=\{G \cdot M_3 \cdot M_1/(|P_3-P_1|^3)\} * (P_3-P_1) \tag{52}$$

where $M_3$ is the mass of the Moon and $P_3$ is a position vector of the Moon $P_3(x_3,y_3)$. The universal gravitation $f_{13}$ is also a vector.

Using the relationship $$F_1=f_{12}+f_{13} \tag{53},$$

and erasing $F_1$, $f_{12}$, and $f_{13}$ from equations (49), and from (51) to (53), the following equation is derived.

$$a_1=\{G \cdot M_2/(|P_2-P_1|^3)\} * (P_2-P_1)+\{G \cdot M_3/(|P_3-P_1|^3)\} * (P_3-P_1) \tag{54}$$

where $\{G \cdot M_2/(|P_2-P_1|^3)\} * (P_2-P_1)$ is an acceleration part by gravitation of the Earth 102 and $\{G \cdot M_3/(|P_3-P_1|^3)\} * (P_3-P_1)$ is an acceleration part by gravitation of the Moon 103.

Similarly the acceleration of the Earth $a_2$ is given as below.

$$a_2=\{G \cdot M_3/(|P_3-P_2|^3)\} * (P_3-P_2)+\{G \cdot M_1/(|P_1-P_2|^3)\} * (P_1-P_2) \tag{55}$$

where $\{G \cdot M_3/(|P_3-P_2|^3)\} * (P_3-P_2)$ is an acceleration part by gravitation of the Moon 103 and $\{G \cdot M_1/(|P_1-P_2|^3)\} * (P_1-P_2)$ is an acceleration part by gravitation of the Sun 101. Here $a_2$ is a vector $a_2(a_{x2}, a_{y2})$. Further the acceleration of the Moon $a_3$ is similarly given as below.

$$a_3=\{G \cdot M_1/(|P_1-P_3|^3)\} * (P_1-P_3)+\{G \cdot M_2/(|P_2-P_3|^3)\} * (P_2-P_3) \tag{56}$$

where $\{G \cdot M_1/(|P_1-P_3|^3)\} * (P_1-P_3)$ is an acceleration part by gravitation of the Sun 101 and $\{G \cdot M_2/(|P_2-P_3|^3)\} * (P_2-P_3)$ is an acceleration part by gravitation of the Earth 102. Here $a_3$ is a vector $a_3(a_{x3}, a_{y3})$.

The simultaneous differential equations (54), (55), and (56) can be solved using a dynamic analysis as three-body problem by incrementing the analytical small time increment $\Delta t$ by one hour and finally simultaneous differential equations with six unknowns are to be solved all together because every two unknowns are included in each simultaneous equation. Now initial values are explained. Firstly time t=0 is taken at the moment when the Sun 101, the Earth 102, and the Moon 103 are on the straight-line, the Sun 101 is deemed as the origin, the directions of the Earth 102 and the Moon 103 are taken in +x direction, and the velocity vectors of the Earth 102 and the Moon 103 are taken in +y direction.

Conditions and parameters are given below.

Initial distance between the Sun 101 and the Earth 102: 1.496×$10^{11}$ (m)

Initial distance between the Earth 102 and the Moon 103: 3.844×$10^8$ (m)

Initial velocity of the Earth 102: 2.978×$10^4$ (m/s)

Initial period of the Moon 103: 27.3217 (day)

Initial relative velocity of the Moon 103 to the Earth 102: 1023 (m/s)

Mass of the Sun 101 $M_1$: 1.989×$10^{3\circ}$ (kg)

Mass of the Earth 102 $M_2$: 5.974×$10^{24}$ (kg)

Mass of the Moon 103 $M_3$: 7.347×$10^{22}$ (kg)

Universal gravitation constant G: 6.67259×$10^{-11}$ (N·m²/kg²).

To solve this three-body problem, accelerations $a_{x1}$, $a_{y1}$, $a_{x2}$, $a_{y2}$, $a_{x3}$, $a_{y3}$ are calculated assigning each initial value to the equations (54), (55), and (56). Then velocities $v_{x1}(t+\Delta t)$, $v_{y1}(t+\Delta t)$, $v_{x2}(t+\Delta t)$, $v_{y2}(t+\Delta t)$, $v_{x3}(t+\Delta t)$, and $v_{y3}(t+\Delta t)$ after lapse of the analytical small time increment $\Delta t(=3600$ (s)) are calculated by the equation (2). Further displacements $x_1$(t+

Δt), $y_1(t+\Delta t)$, $x_2(t+\Delta t)$, $y_2(t+\Delta t)$, $x_3(t+\Delta t)$, and $y_3(t+\Delta t)$ after lapse of the analytical small time increment $\Delta t(=3600\,(s))$ are calculated by the equation (3). Accelerations $\alpha_{x1}(t+\Delta t)$, $\alpha_{y1}(t+\Delta t)$, $\alpha_{x2}(t+\Delta t)$, $\alpha_{y2}(t+\Delta t)$, $\alpha_{x3}(t+\Delta t)$, and $\alpha_{y3}(t+\Delta t)$ after lapse of the analytical small time increment $\Delta t(=3600\,(s))$ are calculated using these obtained $v_{x1}(t+\Delta t)$, $v_{y1}(t+\Delta t)$, $v_{x2}(t+\Delta t)$, $v_{y2}(t+\Delta t)$, $v_{x3}(t+\Delta t)$, $v_{y3}(t+\Delta t)$, $x_1(t+\Delta t)$, $y_1(t+\Delta t)$, $x_2(t+\Delta t)$, $y_2(t+\Delta t)$, $x_3(t+\Delta t)$, and $y_3(t+\Delta t)$, and the process is repeated specified number of times.

Figure 41:
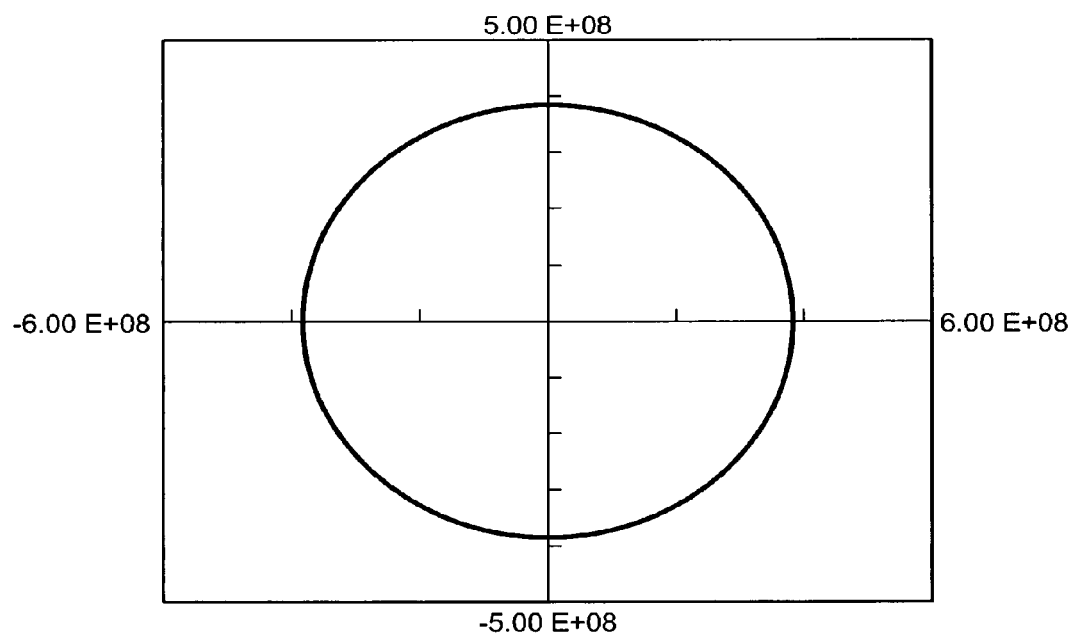
FIG. 41 is a graph of a dynamic analysis result of the orbit of the Moon in three-body problem placing the Earth in the center.

FIG. 41 is a graph of a dynamic analysis result of the orbit of the Moon in three-body problem above, placing the Earth in the center. From this dynamic analysis result, as shown in FIG. 41, almost the same dynamic characteristic has been obtained as the output result of a dynamic analysis device that performs time consuming analysis of high precision combining many processes like correction process including the feedback processing.

Figure 42:
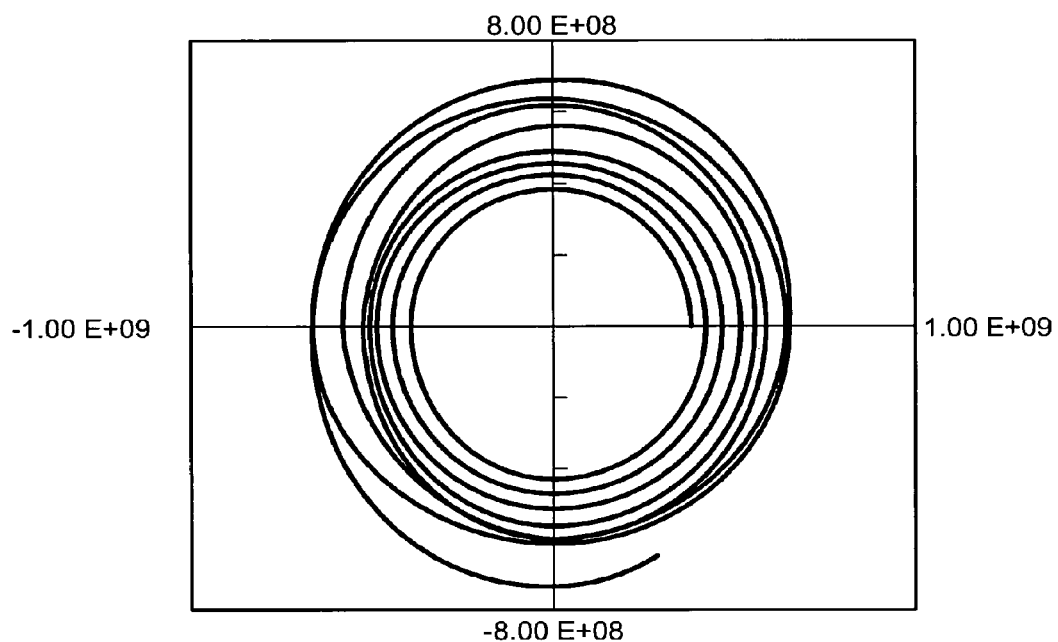
FIG. 42 is a graph of a dynamic analysis result of the orbit of the Moon by conventional Euler's method placing the Earth in the center.

FIG. 42 is a graph of a dynamic analysis result of the orbit of the Moon using conventional Euler's method, placing the Earth in the center. The dynamic analysis whose result is shown in FIG. 42 was performed with the same analytical small time increment Δt=3600 second as in tenth application and it shows that the orbit of the Moon diverges and no numerical analysis result of high precision could be obtained.

(Eleventh Application)

Figure 43:
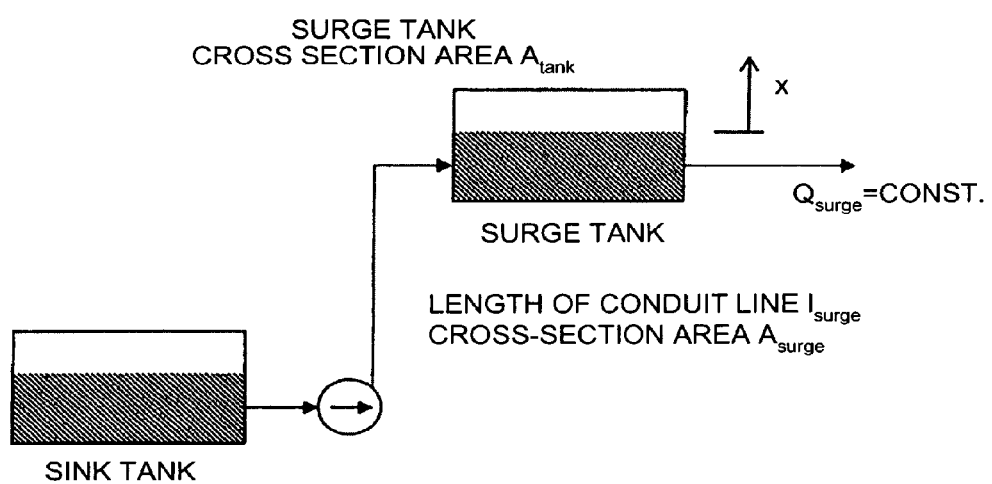
FIG. 43 is a schematic diagram of an outline of configuration of a surge tank, to which dynamic analysis is applied, with a centrifugal pump.

FIG. 43 is a schematic diagram of an outline of configuration of a surge tank, to which the dynamic analysis is applied, with a centrifugal pump. The equation of motion specific for water level change of the surge tank is given as an equation (57) below.

$$((l_{surge}A_{surge})/(g \cdot A_{tank}))\alpha_{surge}=(A_{tank}h'(Q_{surge})-2V_{surge}Q_{surge}A_{surge}/A_{tank}^2)v_{surge}-x_{surge} \quad (57)$$

where,
g: acceleration of gravity (9.807),
$l_{surge}$: length of the conduit line (10.000),
$A_{sure}$: cross-section area of the conduit line (0.008),
$A_{tank}$: cross-section area of the surge tank (0.100),
$Q_{surge}$ flow rate (0.012),
h' $(Q_{surge})=2.67\times10^9 Q_{surge}^3 - 1.2\times10^8 Q_{surge}^2 + 1.2\times10^5 Q_{surge} + 472.487$: (head-discharge curve differentiated by flow rate),
$V_{surge}$ pressure loss coefficient (0.144),
$X_{surge}$ water level change of the surge tank (initial value=0.02),
$v_{surge}$: velocity of water level change of the surge tank (initial value=0.00),
$\alpha_{surge}$ acceleration of water level change of the surge tank,
and these are shown in the International System of Units.

In this case, an analysis equation is derived from the equation (57) and is given as an equation (58) below.

$$\alpha_{surge}=((g \cdot A_{tank})/(l_{surge}A_{surge}))\{(A_{tank}h'(Q_{surge})-2V_{surge}Q_{surge}A_{surge}/A_{tank}^2)v_{surge}-x_{surge}\} \quad (58)$$

Acceleration of water level change of the surge tank $\alpha_{surge}$ is calculated assigning parameters, initial water level change of the surge tank $x_{surge}(t_0)=0.02$, and initial velocity of water level of the surge tank $v_{surge}(t_0)=0.00$ to the equation (58). Then velocity of water level change $v_{surge}(t+\Delta t)$ after lapse of analytical small time increment $\Delta t(=0.01\,(s))$ is calculated by the equation (2). Further water level change $x_{surge}(t+\Delta t)$ after lapse of the analytical small time increment $\Delta t(=0.01\,(s))$ is calculated by the equation (3). Acceleration of water level change $\alpha_{surge}(t+\Delta t)$ after lapse of the analytical small time increment $\Delta t(=0.01\,(s))$ is calculated using these obtained $v_{surge}(t+\Delta t)$ and $x_{surge}(t+\Delta t)$, and the process is repeated specified number of times.

Figure 44:
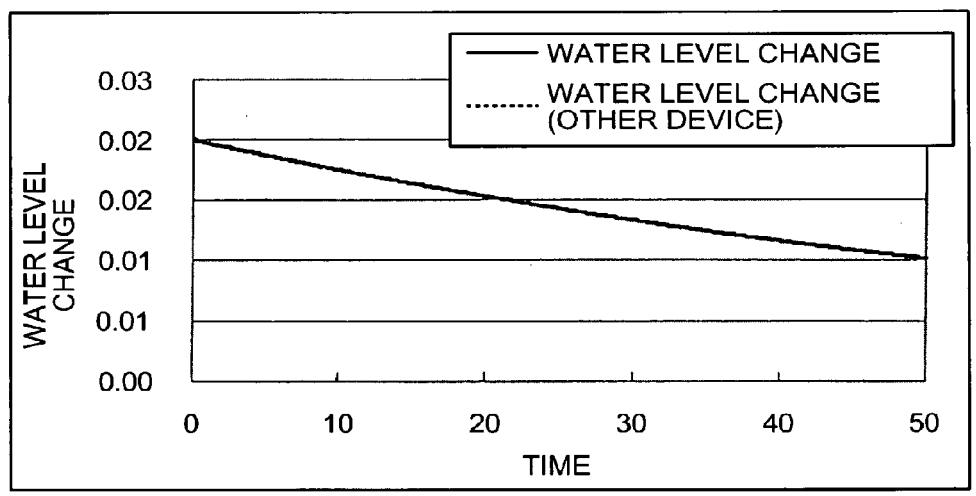
FIG. 44 is a graph of a dynamic analysis result of the change of water level of the surge tank shown in FIG. 43.

FIG. 44 is a graph of a dynamic analysis result of the change of water level of the surge tank shown in FIG. 43. From this dynamic analysis result, as shown in FIG. 44, almost the same dynamic characteristic has been obtained as the output result of a dynamic analysis device that performs time consuming analysis of high precision combining many processes like correction process including the feedback processing.

(Twelfth Application)

Figure 45:
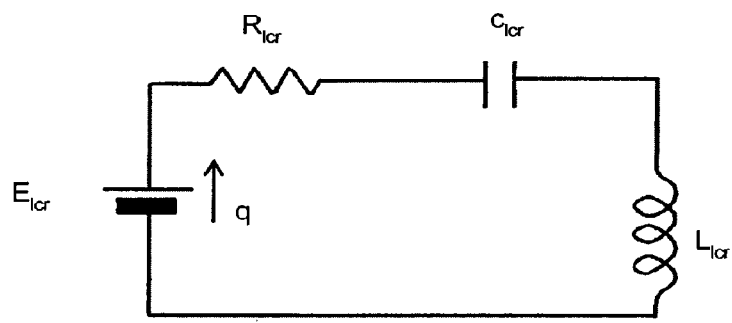
FIG. 45 is a schematic diagram of an outline of configuration of an LCR circuit to which dynamic analysis is applied.

FIG. 45 is a schematic diagram of an outline of configuration of an LCR circuit to which the dynamic analysis is applied. The equation of motion specific for electric charge of the LCR circuit is given as equation (59) below.

$$L_{lcr}(d^2q/dt^2)+R_{lcr}i+q/c_{lcr}=E_{lcr} \quad (59)$$

where,
$L_{lcr}$: inductance (0.20),
$R_{lcr}$: resistance (5.00),
$c_{lcr}$: capacitance (0.002),
$E_{lcr}$: voltage (initial value=5.00),
q: electric charge (initial value=0.00),
i: current (initial value=0.00),
and these are shown in the International System of Units.

In this case, the analysis equation is derived from the equation (59) and is given as an equation (60) below.

$$(d^2q/dt^2)=(1/L_{lcr})(-R_{lcr}i-q/c_{lcr}+E_{lcr}) \quad (60)$$

Second-order time derivative of the electric charge $(d^2q/dt^2)$ is calculated assigning parameters, initial electric charge $q(t_0)=0.00$, and initial current $i(t_0)=0.00$ to the equation (60). Then current $i(t+\Delta t)$ after lapse of analytical small time increment $\Delta t(=0.001\,(s))$ is calculated by the equation (2). Further electric charge $q(t+\Delta t)$ after lapse of the analytical small time increment $\Delta t(=0.001\,(s))$ is calculated by the equation (3). Second-order time derivative of the electric charge $(d^2q(t+\Delta t)/dt^2)$ after lapse of the analytical small time increment $\Delta t(=0.001\,(s))$ is calculated using these obtained $i(t+\Delta t)$ and $q(t+\Delta t)$, and the process is repeated specified number of times.

Figure 46:
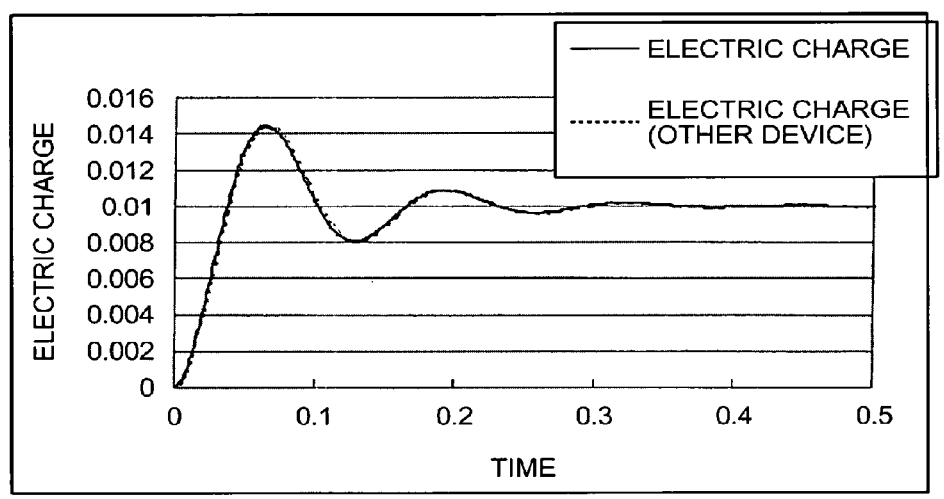
FIG. 46 is a graph of a dynamic analysis result of the change of electric charge in the LCR circuit shown in FIG. 45.

FIG. 46 is a graph of a dynamic analysis result of change of electric charge in the LCR circuit shown in FIG. 45. From this dynamic analysis result, as shown in FIG. 46, almost the same dynamic characteristic has been obtained as the output result of a dynamic analysis device that performs time consuming analysis of high precision combining many processes like correction process including the feedback processing.

The dynamic analysis device that is an example of the numerical analysis device can be implemented by running prepared programs on a computer system like a personal computer or workstation. Here a computer system is explained that runs dynamic analysis programs that have similar function as the said dynamic analysis devices.

Figure 47:
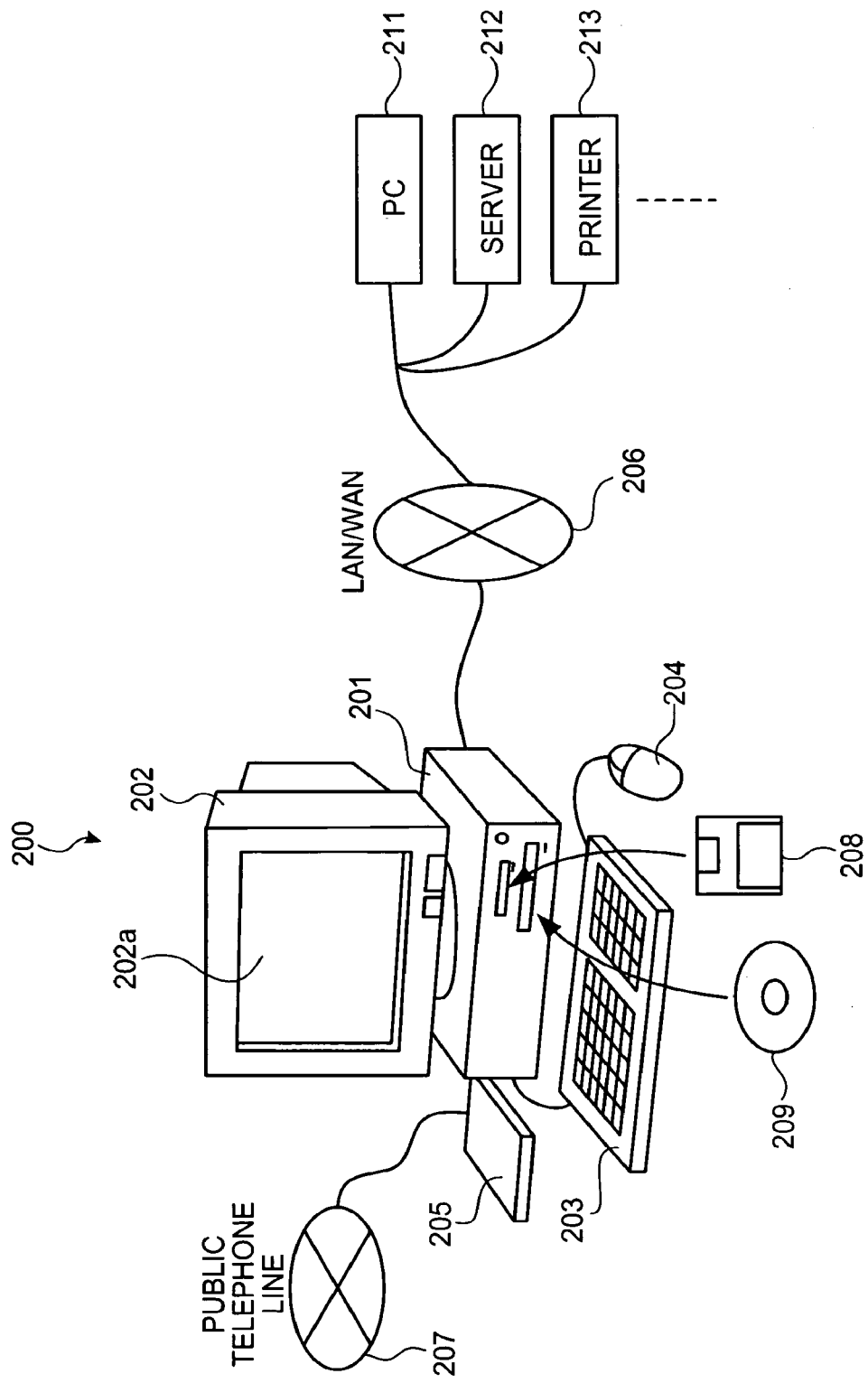
FIG. 47 is a system configuration schematic diagram of a configuration of a computer system that implements the dynamic analysis device.
Figure 48:
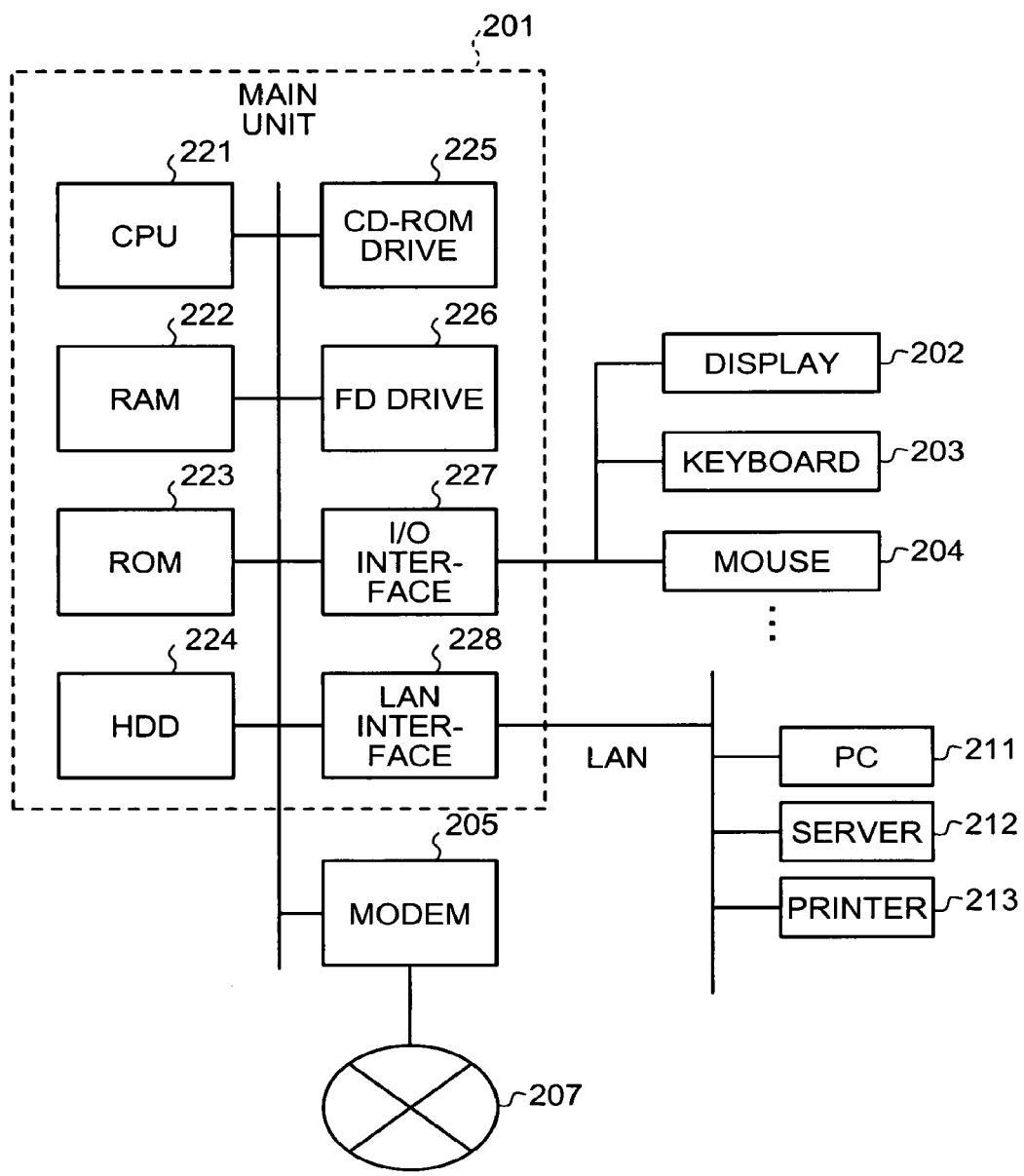
FIG. 48 is a block diagram of a configuration of a main unit of the computer system shown in FIG. 47.

FIG. 47 is a schematic diagram of a computer system configuration that implements the dynamic analysis device and FIG. 48 is a block diagram of configuration of the main body of the computer system shown in FIG. 47.

Referring to FIG. 47, a computer system 200 includes a main unit 201, a display 202 to display information such as images on a display screen 202a according to indication by the main unit 201, a keyboard 203 to input various information to the computer system 200, and a mouse 204 to point arbitrary location on the display screen 202a of the display 202.

The main unit 201 of the computer system 200 includes, as shown in FIG. 48, a CPU 221, a RAM 222, a ROM 223, a hard disk drive (HDD) 224, a CD-ROM drive 225 that accepts a CD-ROM 209, an FD drive 226 that accepts a flexible disk (FD) 208, an I/O interface 227 to connect to the display 202, to the keyboard 203, and to the mouse 204, and a LAN interface 228 to connect to a local area network/wide area network (LAN/WAN) 206.

A modem 205 for connection to a public telephone line 207 for internet and the like is connected to the computer system 200 and furthermore a computer system (PC) 211, a server 212, and a printer 213 and the like are connected via the LAN interface 228 and the LAN/WAN 206 to the computer system 200.

The computer system 200 implements a dynamic analysis device in the first and the second embodiment by reading out and executing dynamic analysis programs recorded on specified recording media.

The specified recording media include, besides "removable physical media" such as the flexible disk (FD) 208, the CD-ROM 209, a magneto-optical disk, a DVD, an optical-magnetic disk, and an IC card, all recording media to store dynamic analysis programs that can be read out by the computer system 200, such as the hard disk drive (HDD) 224 that is installed inside or outside of the computer system 200, "irremovable physical media" like the RAM 222 and the ROM 223, "communication media" that can retain programs for a short period of time for transmitting the programs, such as the public telephone line 207 connected via the modem 205, or the LAN/WAN 206 to which another the computer system 211 and the server 212 are connected.

Namely, the dynamic analysis programs are recorded on the "removable physical media", "irremovable physical media" and "communication media" to be legible to a computer, and the computer system 200 reads out the dynamic analysis programs from the recording media and runs them to implement dynamic analysis devices in the first and the second embodiment.

The dynamic analysis programs are not limited to be run on the computer system 200 but also can be run on another computer system 211 or the server 212, and even when they work together the present invention can be applied as well.

Each component of the devices shown in the figures only represents the concept of the function and shall not necessarily be implemented as shown in the figures. In other words, a concrete aspect of partition or integration of each device shall not be limited as illustrated but it is allowed to configure all or a part of the device being functionally or physically partitioned or integrated in arbitrary unit depending on various conditions of loads and use.

Each process function that is performed on each device can all or partly be implemented by CPU and analysis programs that run on the CPU, and can also be implemented as wired logic hardware.

INDUSTRIAL APPLICABILITY

Thus the present invention is useful for numerical analysis devices as well as numerical analysis programs that are applied in control field to analyze various aspects of motion in natural phenomena, mechanical motion and the like.

The invention claimed is:

1. A numerical analysis device that performs, using a spreadsheet program, a numerical analysis of second-order differential equation representing an aspect of change, which is a target object to be analyzed, to dynamically analyze the aspect of change, the numerical analysis device comprising a control unit, an output unit, and a memory unit that stores therein the spreadsheet program, wherein the control unit comprises:
a setting unit that performs a setting of parameters including an initial condition of the second-order differential equation and a setting of an analytical small variable value for the numerical analysis;
a second-derivative calculation unit that calculates a second derivative of the second-order differential equation at a reference variable value, which is a variable at the start of the numerical analysis, using a first derivative and a physical value of the second-order differential equation at the reference variable value, which are shown in cells among cells in a matrix form on a display screen of the spreadsheet program output on the output unit in advance;
a first-derivative calculation unit that performs a multiplication of the second derivative shown in the cell on the display screen and calculated by the second-derivative calculation unit by the analytical small variable value and an addition of the first derivative of the second-order differential equation at the reference variable value shown in the cell on the display screen to a value obtained by the multiplication, and outputs a value obtained by the addition as a first derivative after an increment of the analytical small variable value;
a physical-value calculation unit that performs a multiplication of the second derivative shown in the cell on the display screen and calculated by the second-derivative calculation unit by a square value of the analytical small variable value, a multiplication of the first derivative of the second-order differential equation at the reference variable value shown in the cell on the display screen by the analytical small variable value, and an addition of values obtained by the multiplications and a physical value of the second-order differential equation at the reference variable value, and outputs a value obtained by the addition as a physical value after an increment of the analytical small variable value;
an operation control unit that repeats a control of setting a variable value obtained by adding the analytical small variable value to the reference variable value as a new reference variable value and causing the second-derivative calculation unit, the first-derivative calculation unit, and the physical-value calculation unit to calculate the second derivative, the first derivative, and the physical value, using the new reference variable value, respectively; and
an output processing unit that outputs, to cells on the display screen, the second derivative for each reference variable value calculated by the second-derivative calculation unit, the first derivative for each reference variable value calculated by the first-derivative calculation unit, the physical value for each reference variable value calculated by the physical-value calculation unit, and the reference variable values set by the operation control unit, in association with the increment of the analytical small variable value,
wherein the output processing unit repeatedly performs a first process, a second process, a third process, and a fourth process,
the first process causing the cells in a first line to show the reference variable value at the start of the numerical analysis and the initial condition,
the second process causing other cells in the first line to show the second derivative at the reference variable value calculated by the second-derivative calculation unit, the first derivative after the increment of the analytical small variable value calculated by the first-derivative calculation unit, and the physical value after the increment of the analytical small variable value calculated by the physical-value calculation unit, the third process causing a cell in a second line to show the new reference variable value set by the operation control unit, and the fourth process copying the first derivative after the increment of the analytical small variable value and the physical value after the increment of the analytical small variable value in the first line in order to shown them in other cells in the second line, wherein the second-derivative calculation unit uses the first derivative and the physical value shown in the cells in the second line to calculate the second derivative of the second-order differential equation at the new reference variable value set by the operation control unit, and wherein the output processing unit generates a graph of the physical value for each reference variable value calculated by the physical-value calculation unit corresponding to the increment of the analytical small variable value.

2. A non-transitory computer-readable recording medium having a numerical analysis spreadsheet program for a numerical analysis of second-order differential equation representing an aspect of change, which is a target object to be analyzed, recorded thereon to dynamically analyze the aspect of change, the numerical analysis program causing a computer comprising a control unit, an output unit and a memory unit that stores therein the spreadsheet program to execute:

parameter setting including performing a setting of parameters including an initial condition of the second-order differential equation and a setting of an analytical small variable value for the numerical analysis;

second-derivative calculating including calculating a second derivative of the second-order differential equation at a reference variable value, which is a variable at the start of the numerical analysis, using a first derivative and a physical value of the second-order differential equation at the reference variable value, which are shown in cells among cells in a matrix form on a display screen of the spreadsheet program output on the output unit in advance;

first-derivative calculating including performing a multiplication of the second derivative shown in the cell on the display screen and calculated at the second-derivative calculating by the analytical small variable value and an addition of the first derivative of the second-order differential equation at the reference variable value shown in the cell on the display screen to a value obtained by the multiplication, and outputting a value obtained by the addition as a first derivative after an increment of the analytical small variable value;

physical-value calculating including performing a multiplication of the second derivative shown in the cell on the display screen and calculated at the second-derivative calculating by a square value of the analytical small variable value, a multiplication of the first derivative of the second-order differential equation at the reference variable value shown in the cell on the display screen by the analytical small variable value, and an addition of values obtained by the multiplications and a physical value of the second-order differential equation at the reference variable value, and outputting a value obtained by the addition as a physical value after an increment of the analytical small variable value;

operation controlling including repeating a control of
setting a variable value obtained by adding the analytical small variable value to the reference variable value as a new reference variable value, and causing the second-derivative calculating, the first-derivative calculating, and the physical-value calculating to calculate the second derivative, the first derivative, and the physical value, using the new reference variable value, respectively; and output processing including outputting, to cells on the display screen, the second derivative for each reference variable value calculated at the second-derivative calculating, the first derivative for each reference variable value calculated at the first-derivative calculating, the physical value for each reference variable value calculated at the physical-value calculating, and the reference variable values set by the operation controlling, in association with the increment of the analytical small variable value, wherein the output processing repeatedly performs a first process, a second process, a third process, and a fourth process, the first process causing the cells in a first line to show the reference variable value at the start of the numerical analysis and the initial condition, the second process causing other cells in the first line to show the second derivative at the reference variable value calculated at the second-derivative calculating, the first derivative after the increment of the analytical small variable value calculated at the first-derivative calculating, and the physical value after the increment of the analytical small variable value calculated at the physical-value calculating, the third process causing a cell in a second line to show the new reference variable value set by the operation controlling, and the fourth process copying the first derivative after the increment of the analytical small variable value and the physical value after the increment of the analytical small variable value in the first line in order to shown them in other cells in the second line, wherein the second-derivative calculating uses the first derivative and the physical value shown in the cells in the second line to calculate the second derivative of the second-order differential equation at the new reference variable value set by the operation controlling, and wherein the output processing generates a graph of the physical value for each reference variable value calculated at the physical-value calculating corresponding to the increment of the analytical small variable value.

* * * * *